(12) United States Patent
Saunkeah et al.

(10) Patent No.: US 12,190,370 B2
(45) Date of Patent: Jan. 7, 2025

(54) SYSTEMS AND METHODS FOR DYNAMIC POST-TRANSACTION ORDERS AND REDEMPTION

(71) Applicant: Loop Commerce, Inc., Stamford, CT (US)

(72) Inventors: Gabriel Saunkeah, Berkeley, CA (US); Roy Erez, Palo Alto, CA (US); Alex Sirota, Los Altos, CA (US); Shane Parrish, Menlo Park, CA (US); David Warmerdam, Stamford, CT (US)

(73) Assignee: LOOP COMMERCE, INC., Stamford, CT (US)

( * ) Notice: Subject to any disclaimer, the term of this patent is extended or adjusted under 35 U.S.C. 154(b) by 66 days.

(21) Appl. No.: 18/168,804

(22) Filed: Feb. 14, 2023

(65) Prior Publication Data

US 2023/0260009 A1    Aug. 17, 2023

Related U.S. Application Data

(60) Provisional application No. 63/310,417, filed on Feb. 15, 2022.

(51) Int. Cl.
*G06Q 30/0601* (2023.01)
(52) U.S. Cl.
CPC ................. *G06Q 30/0637* (2013.01)
(58) Field of Classification Search
CPC .................................. G06Q 30/0637
See application file for complete search history.

(56) References Cited

U.S. PATENT DOCUMENTS

| 2009/0234716 | A1* | 9/2009 | Mallick | G06Q 30/0256 |
| | | | | 705/37 |
| 2014/0278962 | A1* | 9/2014 | Rauh | G06Q 50/01 |
| | | | | 705/14.51 |
| 2022/0108382 | A1* | 4/2022 | Chliaifchtein | G06Q 30/0641 |

OTHER PUBLICATIONS

S. Mamonov and R. Benbunan-Fich, "To Give or Not to Give? An Exploratory Study of User Beliefs Influencing Adoption of Facebook Gifts," 2015 48th Hawaii International Conference on System Sciences, Kauai, HI, USA, 2015, pp. 2063-2072, doi: 10.1109/HICSS.2015.246. (Year: 2015).*

* cited by examiner

*Primary Examiner* — Michelle T Kringen
(74) *Attorney, Agent, or Firm* — Polsinelli LLP

(57) ABSTRACT

Systems and methods for determining whether a transaction between a consumer and a retailer qualifies for the consumer to receive an offer to send a gift received as a result of the transaction to a separate recipient. A gifting service system receives order confirmation details associated with the transaction, and assesses a variety of information from various sources to determine if the transaction qualifies for the offer. If so, the offer to send a gift is presented to the consumer. Once the consumer accepts the offer, the gifting service system obtains various selections and items of information, and sends a gift notification to an intended recipient. The gifting service system interacts with the recipient to obtain various selections and items of information to facilitate delivery of the gift to the recipient.

28 Claims, 13 Drawing Sheets

SYSTEMS AND METHODS FOR DYNAMIC POST-TRANSACTION ORDERS AND REDEMPTION

CROSS-REFERENCE TO RELATED APPLICATIONS

The present application claims priority from U.S. Provisional Patent Application 63/310,417 filed Feb. 15, 2022, which is incorporated herein by reference in its entirety.

FIELD

The present disclosure relates to systems and methods for determining, after a transaction has completed, whether to transmit a send offer to a consumer based on order confirmation details and sender information, where the send offer is an offer for the purchaser to send an ancillary gift based on the completion of the transaction.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment", one or more embodiments, or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
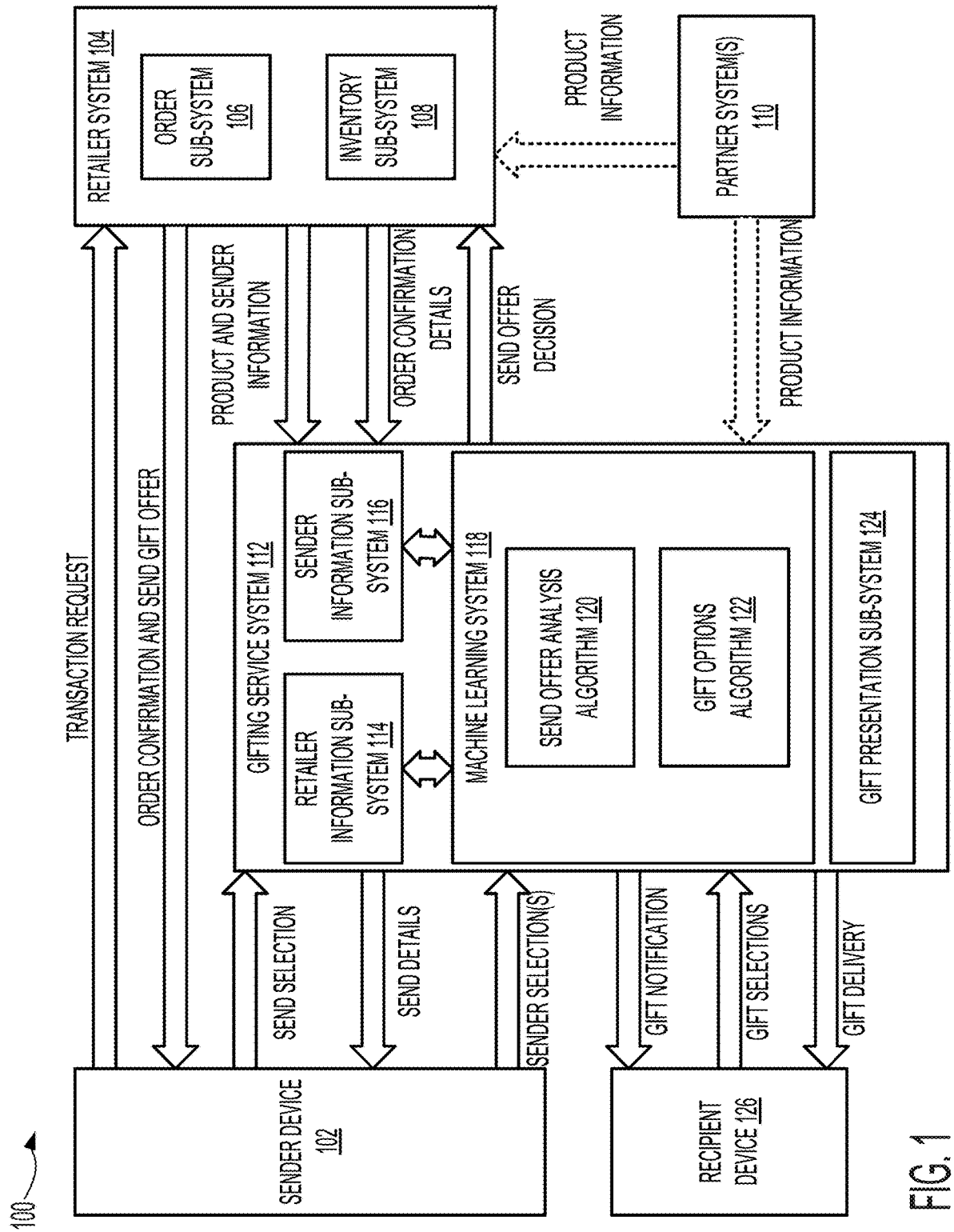
FIG. 1 shows an illustrative example of an environment in which a consumer conducts a transaction with a retailer, a determination is made as to whether the transaction qualifies for the receipt of an offer to send a gift to a separate recipient, information is obtained from the consumer related to sending a gift, information is obtained from an intended recipient of the gift to facilitate the delivery of the gift, and the gift is delivered.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Consumers looking to conduct a transaction (e.g., a purchase) with a retailer may be incentivized to do so, at least in part, based on an offer of receiving a gift as a result of completing the transaction (i.e., a gift with purchase). A gift may be any item, service, item representation, etc. that may be provided to any recipient, e.g., as a reward. Examples of a gift may include, but are not limited to, goods, services, gift cards, coupons, experience opportunities (e.g., travel, dining, shopping spree, celebratory meeting, etc.), financial products (e.g., stocks, cryptographic currency, non-fungible tokens, etc.), points, etc. A retailer may advertise such an incentive to consumers. In one or more embodiments, such an advertisement sets forth that the consumer would have the option to send the gift to a separate recipient. Additionally or alternatively, an option to send the gift to a separate recipient may be presented to the consumer after the completion of the transaction. For example, such an option may be presented as part of an order confirmation (e.g., confirmation email, confirmation webpage, etc.) presented to the consumer after the consumer has completed the transaction (e.g., made a purchase).

Embodiments disclosed herein may provide a framework for dynamically determining whether an option to send a gift received as a result of completing a transaction should be presented to the consumer that completed the transaction (i.e., made the purchase), and for dynamically determining what one or more gift options to send to a recipient should be presented to the consumer. Through this framework, details about the transaction may be obtained from order confirmation details (e.g., purchase price, purchase date, product purchased, product category, etc.) intended for the consumer (i.e., the purchaser) once the transaction has been completed. Such information, as well as information about the consumer, information related to inventory of potential gift items, etc., may be dynamically analyzed in real-time to determine whether to provide the consumer with an option to send a gift received for completing a transaction to a separate recipient. Such information may be further dynamically analyzed to determine what one or more gift options should be presented to the consumer in the event that the consumer chooses to send the gift to a separate recipient. In one or more embodiments, if a consumer elects to send a gift, various gift options and requests for information (e.g., contact information of the intended recipient) may be presented to the consumer. In one or more embodiments, once requisite selections are made, and requested information provided by the consumer, the recipient may be notified of the gift. After receiving the notification, the recipient of the gift may have the opportunity to make various selections, customizations, etc. related to the gift. The gift may then be delivered to the recipient. In one or more embodiments, by providing a consumer with the opportunity to be a sender of a gift received as a result of completing a transaction to a separate recipient, a retailer may improve the conversion rate of the transaction (by way of offering the gift), while at the same time gaining additional information about the separate recipient, which allows the retailer an opportunity to potentially acquire a new customer (i.e., the recipient).

FIG. 1 shows an illustrative example of an environment 100 in which a sender device 102 interacts with a retailer system 104 in order to conduct a transaction. The sender device 102 may be a computing device such as the computing device 1302 described herein at least in connection with FIG. 13. The computing device may be, for example, a laptop computer, a desktop computer, a smartphone, a tablet, a smart watch, or any other type of computing device such as those described herein. As another example, a consumer may make a purchase at a physical retail establishment, and the sender device 102 may be a device provided by the retail establishment (i.e., as a point-of-sale service) to allow the consumer to interact with the retailer system. In one or more embodiments, the sender device communicates with the retailer system 104 over a network (not shown) such as the network 1322 described herein at least in connection with FIG. 13. The retailer system 104 may be one or more computing devices such as the computing device 1302 described herein at least in connection with FIG. 13. As an example, the retailer system 104 may be one or more server computing devices controlled or otherwise used by a retailer (not shown). In one or more embodiments, a retailer is any entity that offers for sale any number of products (i.e., goods and/or services).

As an example, a consumer may use a browser application (not shown) or other application (not shown) of the sender device 102 to peruse product offerings of a retailer associated with the retailer system 104. While the consumer accesses various webpages or other channels offering product(s) of the retailer, certain product offers may be accompanied by advertisements indicating that, if the product is purchased, the consumer may receive an additional gift (i.e., a gift with purchase). An advertisement of a gift to be provided if the consumer purchases the product may be used by the retailer as a mechanism for converting a potential purchase into a purchase by adding further incentive for the consumer to purchase the product. Such an advertisement may specify one or more possible gifts that may be received if a given product is purchased from the retailer. Such an advertisement may include additional information related to the availability of the one or more gifts. As an example, the advertisement may indicate that the gift offer is a limited time offer, that the gift offer will expire at a certain time in the future, that supplies of the gift are limited, that a certain quantity of gifts is remaining, etc. If presented, such an advertisement may or may not further include information indicating that, if the product is purchased, the consumer will be presented with an option to send the gift to a recipient that is different from the consumer making the purchase. In one or more embodiments, the advertisement is an online advertisement provided by a retailer. In other embodiments, the advertisement is an offline advertisement that includes a feature that allows a consumer to access a product offering online. For example, a print advertisement may include a Quick Response (QR) code, and the consumer may use a sender device 102 to scan the QR code and be navigated to a retailer webpage for one or more product offerings.

In one or more embodiments, when a consumer using a sender device 102 selects one or more products to purchase from a retailer associated with retailer system 104, the consumer, via the sender device 102, may initiate or otherwise request a transaction by which the consumer purchases the one or more products from a retailer. The consumer may be purchasing the one or more products for any purpose (e.g., for personal use, for employment-related use, as one or more gifts for others, etc.).

In one or more embodiments, the transaction request from the sender device 102 is received by the retailer system 104. The transaction request may be processed, at least in part, by an order sub-system 106 of the retailer system 104. The order sub-system 106 may be implemented on one or more computing devices of the retailer system 104, or any portion thereof. Alternatively, the order sub-system 106 may be implemented as an application or other executable process on one or more computing devices of the retailer system 104. In one or more embodiments, the order sub-system 106 is configured to interact with the sender device 102 to obtain various details needed to complete the transaction such as, for example, information about the consumer (e.g., contact information such as an email address), payment information by which the consumer will pay for the one or more products, and/or delivery information (e.g., address to which the one or more products are to be sent). Any other information may be obtained without departing from the scope of embodiments described herein.

The order sub-system 106 may also interact with other portions of the retailer system 104. As an example, the order sub-system may 106 interact with an inventory sub-system 108 of the retailer system 104. The inventory sub-system 108 may be implemented on a computing device of the retailer system 104. Alternatively, the inventory sub-system 108 may be implemented as an application or other executable process on one or more computing devices of the retailer system 104. The order sub-system 106 may interact with the inventory sub-system 108 in order to verify that the product that the consumer seeks to purchase is available, any possible variations (e.g., different sizes, colors, packaged quantities, etc.) that may be available to be selected from, and/or any other information about the product that may be presented to the consumer via the sender device 102.

In one or more embodiments, once relevant information has been obtained from the sender device 102 by the retailer system 104, such as the information described above, the consumer may be presented with a mechanism for completing the transaction. As an example, the retailer system 104 may provide a button in a user interface in a browser application of the sender device 102 that, if selected by the consumer, causes the retailer system 104 to consummate the transaction by accepting payment for the one or more products and initiating delivery of the one or more products to the consumer.

In one or more embodiments, once the transaction has been completed (e.g., the purchase has been made), the order sub-system 106 may generate order confirmation details. Order confirmation details may include any information related to the transaction. For example, order confirmation details may include identification of the one or more products purchased, any details related to the one or more products (e.g., size, color, quantity, etc.), the amount paid for each of the one or more products, total purchase price (e.g., if more than one product was purchased), the date on which the purchase occurred, information related to the purchaser (e.g., purchaser contact information), delivery information (e.g., delivery channel, delivery address, etc.).

In one or more embodiments, all or any portion of the order confirmation details are transmitted from the retailer system 104 to a gifting service system 112. The gifting service system 112 may be one or more computing devices such as the computing device 1302 described herein at least in connection with FIG. 13. As an example, the gifting service system 112 may be one or more server computing devices controlled or otherwise used by a gifting service provider (not shown). In one or more embodiments, the retailer system 104 may also provide product information and/or sender information to gifting service system 112.

In one or more embodiments, product information may be information related to any product that may be offered by the retailer system 104. Product information may be additional information related to the one or more products purchased as a result of the transaction that resulted from the interaction between the sender device 102 and the retailer system 104. Product information may be related to products other than one or more products purchased as a result of the transaction that resulted from the interaction between the sender device 102 and the retailer system 104. Product information may include categorization information defining what one or more categories of products that a given product is in. Product information may include product pricing information. Product information may include identification of products that a retailer wants to be associated with a gift to be offered to a consumer when the product is purchased. Product information may include identification of one or more specific gifts to be associated with a given product. For example, product information may include information indicating that a specific brand of products should be associated with one or more gift options that may be offered to a consumer when a product of the brand is purchased. Product information may include any information related to products that may be offered as gifts to consumers that purchase a product from the retailer. Product information may include information related to inventory levels of one or more products of a retailer and/or of one or more gift options that may be offered to a consumer when one or more products are purchased. Product information may be dynamically updated. As an example, a retailer or partner of a retailer may provide updated and/or new product information from time to time, which may be used to dynamically update the product information.

In one or more embodiments, a retailer system 104 may be associated with one or more partner systems 110. The partner system 110 may be one or more computing devices such as the computing device 1302 described herein at least in connection with FIG. 13. In one or more embodiments, a partner system 110 is associated with a partner of the retailer associated with the retailer system 104. In one or more embodiments, a partner is any entity that has a relationship with the retailer. As an example, a partner may be another retailer or other entity that offers products (e.g., goods and/or services). In one or more embodiments, a partner may desire to provide its products as gifts to consumers that purchase products from the retailer associated with the retailer system 104. For example, a partner may be seeking to gain customers for its products. To that end, the partner may enter into an agreement with the retailer such that the retailer will offer one or more products of the partner as gifts when a consumer purchases one or more products from the retailer. Such an agreement may indicate, for example, that when a certain product, product category, brand, etc. is purchased from the retailer by a consumer (i.e., a purchaser), the retailer will offer the consumer one or more products of the partner as a gift. As another example, the partner may seek to have the retailer offer one or more partner products as gifts to purchasers that purchase one or more products from a retailer within a certain timeframe. As another example, the partner may seek to have the retailer offer one or more products of the partner to purchasers that purchase one or more products from the retailer and are associated with certain characteristics (e.g., have certain demographic characteristics, spent above a certain amount on the purchase, etc.). In one or more embodiments, in order for one or more partner products to be offered as gifts to purchasers who purchase one or more products from the retailer, the partner system 110 may provide product information. Such product information may be provided to the retailer system 104. The retailer system 104 may, in turn, provide the partner product information to the gifting service system 112 (as described above) as part of the product information provided by the retailer system 104. Additionally or alternatively, the partner system 110 may provide the partner product information to the gifting service system 112.

In one or more embodiments, sender information provided from the retailer system 104 to the gifting service system 112 may include additional information related to the consumer that purchased one or more products from the retailer system 104 as detailed in the order confirmation details, and may be provided along with the order confirmation details. For example, the consumer may have created an account with the retailer, and the retailer system may maintain a customer profile associated with the consumer. All or any portion of the information maintained in such a consumer profile may be provided to the gifting service system 112 as part of the sender information. As another example, prior to the transaction in which the consumer used the sender device 102 to purchase one or more products from the retailer via the retailer system 104, the retailer system 104 may provide any information related to any number of consumers to the gifting service system as sender information. In one or more embodiments, the sender information is referred to as sender information because the consumer may ultimately be offered an option to send a gift gained as a result of a purchase to a recipient, thereby becoming a sender of the gift. Sender information may include any information about a consumer such as, for example, demographic information (e.g., name, age, location, etc.), purchase history with the retailer, etc., which may be obtained by the gifting service system 112 from a retailer, and/or sources other than the retailer system 104 (e.g., previous interactions with a consumer, cookies, browser extensions, social media platforms, etc.). Sender information related to a particular consumer and/or to one or more groups of consumers may be referred to as historical sender information. In one or more embodiments, historical sender information is dynamically updated in real-time. As an example, updates may be added to the historical sender information as consumers make purchases from retailers, decide whether or not to send gifts received as a result of purchases to separate recipients, etc.

In one or more embodiments, the gifting service system 112 includes a retailer information sub-system 114. The retailer information sub-system 114 may be one or more computing devices such as the computing device 1302 described herein at least in connection with FIG. 13, or any portion of such computing devices. In one or more embodiments, the retailer information sub-system 114 includes a datastore (not shown) that stores any data received from or otherwise obtained and related to the retailer associated with retailer system 104. As such, the retailer information sub-system 114 may store all or any portion of the product information received from the retailer system 104, all or any portion of any order confirmation details received from the retailer system 104, etc. Such product information, as described above, may include information related to retailer and/or partner products that may be offered as a gift to a consumer that purchased one or more products from the retailer system 104 (e.g., product name, product images, product details, various product customization options, product inventory information, etc.).

In one or more embodiments, the gifting service system 112 includes a sender information sub-system 116. The sender information sub-system 116 may be one or more computing devices such as the computing device 1302 described herein at least in connection with FIG. 13, or any portion of such computing devices. In one or more embodiments, the sender information sub-system 116 includes a datastore (not shown) for storing any information related to consumers that may become senders of a gift received as a result of purchasing one or more products from a retailer associated with the retailer system 104. Such information may be obtained, for example, from the sender information received from the retailer system 104. Such information may further include information about potential senders obtained by the gifting service system 112 obtained from any other source for any other purpose. As an example, the gifting service system 112 may have interacted with the potential sender previously (e.g., for sending a previous gift received with a previous purchase, providing gifting services, etc.) and obtained information about the potential sender through the interaction. As another example, sender information stored in the sender information sub-system 116 may include data related to potential senders obtained via various online sources (e.g., cookies, clickstream data, search data, purchase data, user profile data, etc.), data corresponding to content presented on a website or application (e.g., dates, product details, images, videos, other advertisements, comments, news stories and headlines, etc.), data obtained from e-mails or social media posts/comments, etc.

In one or more embodiments, the gifting service system 112 includes a machine learning system 118. The machine learning system 118 may be implemented on one or more computing devices of the gifting service system 112, such as the computing device 1302 described herein at least in connection with FIG. 13, or any portion of such computing devices. Additionally or alternatively, the machine learning system 118 may be implemented as an application or other executable process on one or more computing devices of the gifting service system 112.

The machine learning system 118 may include a send offer analysis algorithm 120 that is configured to analyze order confirmation details, product information, and/or sender information stored in the retailer information subsystem 114 and/or the sender information sub-system 116 in order to determine whether a consumer that purchased one or more products from the retailer system 104 should be provided an offer to send a gift received as a result of the purchase to a separate recipient. The send offer analysis algorithm 120 may be implemented on one or more computing devices of the gifting service system 112, such as the computing device 1302 described herein at least in connection with FIG. 13, or any portion of such computing devices. Additionally or alternatively, the send offer analysis algorithm 120 may be implemented as an application or other executable process on one or more computing devices of the gifting service system 112.

In one or more embodiments, the send offer analysis algorithm 120 is invoked by the gifting service system 112 in response to receiving or otherwise obtaining or determining order confirmation details associated with a purchase of one or more products from the retailer system 104. The send offer analysis algorithm 120 may include any number of rules to be evaluated in order to determine whether a purchase associated with the order confirmation details qualifies to receive an offer to send a gift received as a result of the purchase to a separate recipient. The send offer analysis algorithm 120 may include rules that associate specific products, categories of product, certain brands, etc. with a gift with purchase. For example, the send offer analysis algorithm 120 may include a rule that indicates that any purchase that includes a purchase of a product of a particular brand qualifies to receive an offer to send a gift received as a result of the purchase to a separate recipient.

The send offer analysis algorithm 120 may include rules that indicate that a gift with purchase will be offered when the purchase is over a certain purchase price. For example, the send offer analysis algorithm 120 may include a rule that a purchase of more than $100 qualifies to receive an offer to send a gift received as a result of the purchase to a separate recipient.

The send offer analysis algorithm 120 may include rules that indicate that a purchase made within a certain data range qualify as a gift with purchase. For example, the send offer analysis algorithm 120 may include a rule that any purchase made in the month of January qualifies to receive an offer to send a gift received as a result of the purchase to a separate recipient.

The send offer analysis algorithm 120 may include rules that indicate that a purchase made by a consumer having certain demographic characteristics qualifies for a gift with purchase. For example, the send offer analysis algorithm 120 may include a rule that any purchase made by a consumer in a certain geographic region, that is of a certain age, that is married, etc. qualifies to receive an offer to send a gift received as a result of the purchase to a separate recipient.

The send offer analysis algorithm 120 may include logic that indicates that a purchase qualifies for a gift with purchase only when such gifts exist in sufficient quantity in the inventory of a retailer associated with the retailer system 104. For example, a retailer may have certain products in inventory that they would like to clear from their inventory. In such a scenario, rather than use the time, effort, and expense associated with moving the products to a secondary market (e.g., factory outlet, auction house, etc.), the retailer may choose to instead allow the products to be offered as gifts to consumers who purchase other products from the retailer. Thus, at any given time, a retailer may have any number of different products that are to be offered as gifts, and each such product may exist in different quantities. The send offer analysis algorithm may therefore analyze the inventory information of the retailer, received as part of the product information from the retailer system 104, to determine whether any such products exist in a quantity range that the retailer has designated as the range within which the product should be offered as a gift with purchase (e.g., if the quantity remaining in inventory is greater than zero). In one or more embodiments, if any such products are available in an appropriate quantity at the time a purchase is made, then the purchase associated with the order confirmation details qualifies to receive an offer to send a gift received as a result of the purchase to a separate recipient.

In one or more embodiments, the above-described rules, and/or any other such rules, may be evaluated by the send offer analysis algorithm 120 in any combination to determine whether a given purchase associated with received order confirmation details qualifies for a gift with purchase As an example, a combination of such rules may indicate, during evaluation of order confirmation details, product information, and sender information, that a purchase of a particular product over a certain price, from a particular brand, within a given sixty day period, qualifies to receive an offer to send a gift received as a result of the purchase to a separate recipient, so long as any products to be offered as gifts exist in the inventory of a retailer.

In one or more embodiments, the send offer analysis algorithm 120 may be or include a machine learning model that is trained to determine whether a given purchase associated with received order details qualifies to receive an offer so send a gift received as a result of a purchase to a separate recipient. Such a machine learning model may use information from order confirmation details, product information, and/or sender information in order to predict whether a given purchase associated with received order confirmation details qualifies to receive an offer to send a gift received as a result of a purchase to a separate recipient.

As an example, a retailer may have a goal of acquiring a certain number of new customers as a result of providing a purchaser an offer so send a gift received as a result of a purchase to a separate recipient, or of acquiring new customers from a certain percentage of such offers. To that end, the machine learning model may be trained to predict the likelihood that providing the offer to send a gift received as a result of a purchase to a particular purchaser will result in the retailer acquiring a new customer, and only purchases with a likelihood over a defined threshold should receive such an offer. The machine learning model may be dynamically updated via continuous training over time to improve its predictive accuracy by adding order confirmation details, product data, and/or sender data associated with purchases for which an offer to send a gift was provided to a consumer, along with the result of whether the offer resulted in the sending of the gift and whether the recipient of the gift accepted the gift and/or became a customer of the retailer, to the training data set for the machine learning model, thereby allowing the machine learning model to better predict the likelihood that providing a purchaser with an offer to send a gift will result in a new customer for the retailer.

Other machine learning techniques may be used as part of the send offer analysis algorithm 120 without departing from the scope of embodiments described herein. As an example, a clustering machine learning algorithm (e.g., k-means clustering algorithms, fuzzy c-means (FCM) algorithms, expectation-maximization (EM) algorithms, hierarchical clustering algorithms, density-based spatial clustering of applications with noise (DBSCAN) algorithms, etc.) may be used to identify whether the order details, product information, and/or sender information associated with or existing at the time of a given purchase include characteristics similar to other purchases for which an offer to send a gift was made and resulted in the acquisition of a new customer for the retailer.

In one or more embodiments, in response to order confirmation details associated with a purchase from a retailer associated with retailer system 104, the send offer analysis algorithm 120 analyzes information from the order confirmation details, product information, and sender information (as described above) and generates a send offer decision. In one or more embodiments, a send offer decision is a decision as to whether or not a consumer that made the purchase corresponding to the order confirmation details should be presented with an offer to send a gift received as a result of the purchase to a separate recipient. In one or more embodiments, the gifting service system 112 transmits the send offer decision to the retailer system 104. Alternatively, in one or more embodiments, the send offer analysis algorithm may be invoked, as described above, before a transaction is completed (i.e., a purchase is made). In such a scenario, a consumer may be offered a gift with purchase prior to actually making the purchase. The consumer may provide various items of information, which may include information associated with a separate recipient to which the consumer would like to send a gift. The offer to send the gift to a separate recipient may be provided based on sender information, product information, and/or information provided by the consumer that is analyzed by the send offer analysis algorithm prior to a purchase or the generation of order details. In one or more embodiments, although the offer to allow a consumer to send a gift received as a result of a purchase to a separate recipient before the purchase is made, and the consumer may choose to send the gift, the gift will not be sent until a transaction (i.e., a purchase) is completed.

In one or more embodiments, when the send offer decision generated by the send offer analysis algorithm 120 of the gifting service system 112 is that an offer to send a gift received as a result of a purchase should not be provided to the consumer that made the purchase, the retailer system 104 proceeds to transmit order confirmation details without said offer to the sender device 102 associated with the consumer. In one or more embodiments, when the send offer decision generated by the send offer analysis algorithm 120 of the gifting service system 112 is that an offer to send a gift received as a result of a purchase should be provided to the consumer that made the purchase, then the retailer system 104 transmits order confirmation details to the sender device 102 associated with the consumer along with the offer to send a gift to a separate recipient. The order confirmation details and offer to send a gift received with purchase to a separate recipient may be transmitted to the sender device 102 in any suitable form. As an example, the order confirmation details and offer may be transmitted in an email sent to an email address associated with the consumer, which may have been provided during the order process, or previously obtained by the retailer system 104. As another example, the order confirmation details and offer may be provided as part of an order confirmation webpage generated by the retailer system 104 and viewed in a browser application (not shown) of sender device 102. In one or more embodiments, the order details and offer are provided to the consumer in multiple forms. For example, a consumer that completes a transaction making a purchase from the retailer may be navigated to a webpage that displays the order confirmation and includes the offer, and the order confirmation and offer may also be sent to the consumer as a separate email.

The offer to send a gift received with the purchase to a separate recipient may be included with the order confirmation details in any form. As an example, the offer may be presented as an element within a page or email that includes text that indicates to the consumer that made the purchase that the purchase has made the consumer eligible to send the gift received as a result of the purchase to a separate recipient (e.g., "Congratulations! You are eligible to send a free gift to a friend!"). The presentation of the offer may also include an interactive element (e.g., a button) that the consumer may select to begin the process of sending the gift. The presentation of the offer may or may not indicate what the specific gift is. The interactive element may be selected by the consumer to access an offer detail page or a stand-alone page associated with and/or provided by the gifting service system 112 in order to select a gift to be delivered an intended recipient. For example, the interactive element may include a signal to the consumer to select the button in order to send the gift received as a result of the purchase to a separate recipient. For example, the button may include text such as "SEND A FREE GIFT WITH GIFTNOW", "Get Started", or other similar text that may be indicative of a gift sending process. The presentation may include an image representing the gift, or one or more of the gifts, if several possible gifts are being offered. The interactive element may be included with the order confirmation details by the retailer system 104 when generating the order confirmation details to transmit to the sender device 102. Alternatively, the user interface interactive element may be inserted with the order confirmation details by the gifting service system 112. As an example, the retailer may insert code into order confirmation webpages that, when the page is viewed, interacts with the gifting service system 112 to obtain and display the offer.

In one or more embodiments, the one or more gifts to be offered to the consumer that made the purchase are determined via a gift options algorithm 122 of the machine learning system 118 of the gifting service system 112. The gift options algorithm 122 may be implemented on one or more computing devices of the gifting service system 112, such as the computing device 1302 described herein at least in connection with FIG. 13, or any portion of such computing devices. Additionally or alternatively, the gift options algorithm 122 may be implemented as an application or other executable process on one or more computing devices of the gifting service system 112. In embodiments where the one or more gift options are presented to the consumer before the consumer selects whether or not to send the gift to a separate recipient, the gift options algorithm 122 may be invoked prior to the transmission of the offer and order confirmation details to the sender device 102. In embodiments where the one or more gift options are not presented to the consumer until after the consumer selects to send a gift, the gift options algorithm 122 may be invoked in response to the consumer selecting to send a gift (e.g., after the consumer selects the button to initiate the gift sending process). As used herein, a gift may be any item or service. Examples include, but are not limited to, a physical item, a gift card, a coupon, a service, etc.

In one or more embodiments, the gift options algorithm 122 analyzes the order confirmation details, the product information, and/or the sender information from the retailer information sub-system 114 and/or the sender information sub-system 116 in order to determine which one or more gift options to provide to the consumer. As an example, the analysis may include determining that the purchase included a product of a particular brand, which is associated with one or more retailer products and/or partner products that are to be offered as gifts with the purchase of a product of that brand. As another example, the analysis may include determining that the purchase was above a certain price, or within a certain price range, and that one or more particular gifts are to be offered with purchases having the price paid by the consumer. As another example, the analysis may include determining the date on which the purchase transaction was completed, and that one or more gift options are to be offered with purchases within a data range that the purchase date is within. As another example, the analysis may include evaluating inventory information to determine what one or more gifts exist in the inventory of the retailer that are to be offered as gifts with purchase. In one or more embodiments, all or any portion of the aforementioned example analyses may be performed by the gift options algorithm 122 in combination to determine what one or more gift options should be presented to the consumer.

In one or more embodiments, the gift options algorithm 122 may be or include a machine learning model that is trained to determine what one or more gifts should be presented to the consumer to send to a separate recipient. As an example, such a machine learning model may use information from order confirmation details, product information, and/or sender information in order to predict what potential gift options are more likely to result on the consumer electing to send a gift to a separate recipient, thereby giving the retailer an opportunity to convert the recipient into a customer of the retailer. In such a scenario, a retailer may have a goal of acquiring a certain number of new customers as a result of providing purchasers with offers to send a gift received as a result of a purchase to a separate recipient, or of acquiring new customers from a certain percentage of such offers. To that end, the machine learning model may be trained to predict which one or more particular gifts of the currently available gift options, when presented to the consumer that made the purchase, are more likely to cause the consumer to decide to send the gift to a separate recipient.

As an example, the trained gift option machine learning model may be trained to determine that consumers having certain demographic characteristics, living in a certain geographic region, and that made a purchase of a particular brand of product are more likely to select to send the gift to a separate recipient when a certain type of gift option is presented to the consumer. The machine learning model may be dynamically updated via continuous training over time to improve its predictive accuracy by adding order confirmation details, product data, and/or sender data associated with purchases for which an offer to send a gift was provided to a consumer, the gift options presented in the offer, and the results of whether the offer resulted in the sending of a gift, the acceptance of the gift by the recipient, and whether the recipient of the gift became a customer of the retailer, to the training data set for the machine learning model, thereby allowing the machine learning model to better predict gift options that are more likely to result in the sending of a gift.

Other machine learning techniques may be used as part of the gift options algorithm 122 without departing from the scope of embodiments described herein. As an example, a clustering machine learning algorithm (e.g., k-means clustering algorithms, fuzzy c-means (FCM) algorithms, expectation-maximization (EM) algorithms, hierarchical clustering algorithms, density-based spatial clustering of applications with noise (DBSCAN) algorithms, etc.) may be used to identify whether the order details, product information, and/or sender information associated with or existing at the time of a given purchase include characteristics similar to other purchases for which an offer to send a gift was made and resulted in the acquisition of a new customer for the retailer.

In one or more embodiments, the consumer may choose not to send a gift by not selecting the interactive element included with the order confirmation to begin the process of sending the gift, in which case no gift will be sent to a separate recipient. The consumer may or may not be given the option of electing to have the gift sent to themselves. In one or more embodiments, if the consumer elects to send a gift to a separate recipient by interacting with the interactive element included with the order confirmation (e.g., selecting the button, clicking a text hyperlink, etc.), then the consumer may be directed to a page (i.e., a webpage) generated by the gifting service system 112. The page may be a standalone page separate from the presentation of the order confirmation details and the offer. The page may be presented as an overlay on top of the order confirmation details and the offer. The page may include a presentation of the gift, such as an image, name, and/or description of the gift. If there is more than one option of what gift to send, the page may include a presentation of the various options via images, names, and/or descriptions of the gifts and a request to select from among the options (e.g., "What gift would you like to send").

In one or more embodiments, the one or more gift options presented to the consumer may depend on when the consumer selects to send a gift (i.e., the timing of the selection to send the gift). As an example, the retailer system 104 may transmit the order confirmation details and offer to send a gift received with the purchase in the form of an email. In such a scenario, the consumer may not immediately open the email, or may open the email but not immediately select to send the gift. Thus, the one or more gift options that would be presented to the consumer may have changed since the time of the purchase. For example, some or all of the gift options that would have been presented if the consumer had elected to send a gift near the time of the purchase may no longer be available (e.g., there were 1000 partner gifts, but all have already been sent). Therefore, the gift options algorithm 122 may be invoked at the time the consumer selects to send the gift in order to determine gift options that are available at the time of the selection to be presented to the consumer.

In one or more embodiments, the page presenting the one or more gift options to the consumer that made the purchase and selected to send a gift (e.g., by selecting the button presented with the order confirmation details) includes an interactive element (e.g., a button) that, when selected (after selecting a gift if more than one are offered), navigates the consumer to another page where additional information is requested from the consumer. The page may include any number of different requests for information. As an example, the page may request that the consumer select a communication channel (e.g., email, text, messenger service, printed mail delivery, etc.) through which the consumer wants the intended recipient to receive notification of the gift. As another example, the page may include a request for a recipient identifier. The recipient identifier may include the name of the intended recipient of the gift, as well as information that facilitates the receipt, by the recipient, of a notification of the gift. The information facilitating the notification portion of the recipient identifier may be based on the communication channel selected (e.g., email address if email is selected, phone number if text message is selected, messenger service name or handle if messenger service is selected, address if mail delivery is selected, etc.). As another example, the page may include a request for the sender (i.e., the consumer that made the purchase for which the gift was received) to provide the sender's name and, optionally, a message to be delivered to the recipient as part of the notification of the gift. As another example, the page may include a request for the sender to select from among various options for virtual gift wrapping that will appear in the notification. Although the above description contemplates various presentations and pages provided to the consumer to complete the gift sending process, all or any portion of the presentations and pages may be combined into a single page, or divided differently into separate pages without departing from the scope of embodiments described herein.

In one or more embodiments, once the sender (i.e., the consumer that made the purchase) makes all requested selections and provides all requested information (which may be referred to collectively as sender selections), the sender device 102 transmits the sender selections to the gifting service system 112. In response to receipt of the sender selections from the sender device 102, the gifting service system 112 may generate a gift notification, and transmit the gift notification to a recipient device 126 associated with the intended recipient. The recipient device 126 may be implemented on one or more computing devices of the gifting service system 112, such as the computing device 1302 described herein at least in connection with FIG. 13. The gift notification may be generated by a gift presentation sub-system 124 of the gifting service system 112. The gift presentation sub-system 124 may be implemented on one or more computing devices of the gifting service system 112, such as the computing device 1302 described herein at least in connection with FIG. 13, or any portion of such computing devices. Additionally or alternatively, the gift presentation sub-system 124 may be implemented as an application or other executable process on one or more computing devices of the gifting service system 112.

In one or more embodiments, the gift notification is transmitted to the recipient device 126 using a communication channel selected by the sender, which may include using at least a portion of the recipient identifier provided by the sender. For example, if email was selected as the communication channel, the gift notification may be transmitted using an email address of the recipient provided by the sender. As another example, if text message was selected as the communication channel, then a phone number of the recipient associated with the recipient device 126 may be used to send the gift notification.

In one or more embodiments, the gift notification includes an indication that the recipient has been sent a gift. The indication may or may not identify the sender of the gift (e.g., "Kelly got you a gift!"). The gift notification may include any other information without departing from the scope of embodiments described herein. As an example, the gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the gift notification may include explanatory information that provides the recipient with various details related to the receipt of the gift (e.g., "You have received a gift. To redeem your gift, select the button above, and provide your address to have your gift shipped to you"). As another example, the gift notification may include information that provides the recipient with other details about the gift redemption process (e.g., that the recipient will have the option to exchange the gift for another gift, that the recipient will have the option to select certain customization options related to the gift, etc.). Options to redeem a gift may be provided to a user physically (e.g., by mail). A gift may be any item, such as a good, service, gift card, coupon, experience opportunity (e.g., travel, dining, shopping spree, celebratory meeting, etc.), financial products (e.g., stocks, cryptographic currency, non-fungible tokens, etc.), points, etc.

In one or more embodiments, when the recipient selects to reveal the gift using the interactive element of the gift notification, the recipient may be navigated to a page that displays the gift that was selected by the sender. The display of the gift may include an image of the gift, the name of the gift, details related to the gift, etc. The page may also include an interactive element that, when selected continues the gift redemption process. The interactive element may include a signal to the recipient indicating that the recipient should select the interactive element (e.g., a button) to continue the gift redemption process. For example, the interactive element may include text, such as "REDEEM YOUR GIFT". In one or more embodiments, the page is generated by the gift presentation sub-system 124. As another example, the offer to redeem a gift may be provided to a user physically (e.g., by mail). In one or more embodiments, the offer to redeem a gift may be provided via more than one channel. As an example, the offer may be sent to the user by mail. If such an offer is not responded to in a certain period of time, the user may also be provided the offer the next time the user accesses the provider system 104.

In one or more embodiments, when the recipient, via the interactive element on the page, selects to continue the gift redemption process, the recipient may be navigated to another page generated by the gift presentation sub-system 124 of the gifting service system 112 that provides various options to the recipient. Such options may include, but are not limited to, the option to accept the gift selected by the sender, or to exchange the gift for another gift from the retailer or a partner of the retailer. The page may include one or more alternate gifts that the recipient could choose to exchange for the gift selected by the sender. The alternate gifts may be presented using an image, a name, and/or details of the one or more alternate gifts. The page may also include an image, name, and or details related to the gift selected by the sender (e.g., for the sake of comparison by the recipient with the one or more alternate gift options).

The page may also include an interactive element that, when selected, allows the recipient to continue the gift redemption process. The interactive element may change, depending on other selections made by the recipient. For example, the interactive element may be a button that, when selected by the recipient, navigates the recipient to another page to continue the gift redemption process. The interactive element may include a signal indicating to the recipient to select the interactive element to continue the process. The signal may, for example, be text, which may change based on other selections of the recipient. As an example, the text may state "Continue" if the recipient checks a check element on the page indicating that they would prefer to continue with the gift selected by the sender, but change to "Exchange this gift" if the recipient checks a check element indicating that they would prefer to exchange the gift for an alternate gift. In one or more embodiments, if the recipient makes a selection on the page indicating that the recipient wants to exchange the gift, then the elements on the page presenting the one or more alternate gift options may be selectable to allow the recipient to indicate which alternate gift the recipient prefers. In such a scenario, the page may also include an indication to the recipient that the recipient should select from among the alternate gift options.

In one or more embodiments, the alternate gift options presented to the recipient are the same as the other gift options that were presented to the sender. In other embodiments, the alternate gift options presented to the recipient are different from the other gift options that were previously presented to the sender. In one or more embodiments, when more than one gift option is presented to the recipient (i.e., the sender-selected gift and one or more alternate gifts), the alternate gifts may be determined by the gift options algorithm 122 of the gifting service system 112. As an example, the gift options algorithm 122 may include a predictive machine learning model that takes as input sender information, product information, inventory information, and/or information associated with the intended recipient to predict one or more alternate gifts that increase the likelihood that the recipient will select to redeem a gift, which may, in turn, increase the likelihood that the retailer gains the recipient as a potential customer.

In one or more embodiments, the one or more gift options presented to the recipient may depend on when the recipient selects to redeem a gift (i.e., the timing of the selection to redeem the gift). As an example, the gifting service system 112 may transmit the gift notification in the form of an email. In such a scenario, the recipient may not immediately open the email, or may open the email but not immediately select to redeem the gift. Thus, the one or more gift options that would be presented to the recipient may have changed since the time of the purchase. For example, some or all of the gift options that would have been presented if the consumer had elected to send a gift near the time of the purchase may no longer be available (e.g., there were 1000 of a particular retailer gift, but no more remain in the retailer's inventory). Therefore, the gift options algorithm 122 may be invoked at the time the recipient selects to redeem the gift in order to present gift options that are available at the time of the selection.

In one or more embodiments, once the recipient has selected to continue with the gift selected by the sender, or selected an alternate gift, the recipient may be presented with various customization options (e.g., size, color, etc.) and requests for information (e.g., address to send the gift to, preferred delivery options, a digital wallet address (e.g., for cryptographic currency, non-fungible tokens, etc.). The customization options and request for information may be presented to the recipient on a subsequent page generated by the gift presentation sub-system 124 of the gifting service system 112. In one or more embodiments, the recipient is also optionally presented with an option to send a thank you to the sender for the gift. Although the above description contemplates various presentations and pages provided to the recipient to complete the gift redemption process, all or any portion of the presentations and pages may be combined into a single page, or divided differently into separate pages, without departing from the scope of embodiments described herein.

In one or more embodiments, once the recipient has made all necessary selections and provided the requested information (which may be referred to collectively as gift selections), the gift selections are transmitted from the recipient device 126 to the gifting service system 112. In one or more embodiments, based at least in part on the gift selections, the gift presentation sub-system 124 of the gifting service system 112 initiates delivery of the selected gift to the recipient. The method of delivery may be based on a selection made by the recipient during the gift redemption process by which the recipient indicated a preferred method of delivery. As an example, the gift may be a gift card, and the recipient may have selected to receive the gift card as a virtual gift card delivered via email. As another example, the gift may be a physical object, and the recipient may have provided a physical address to which the gift is shipped. The gifting service system 112 may perform the delivery of the gift. Additionally or alternatively, the gifting service system may provide information related to the planned delivery to the retailer system 104 and/or the partner system 110, and the retailer system 104 and/or partner system 110 may perform the delivery of the gift to the recipient. In one or more embodiments, regardless of which entity performs the delivery of the gift, information related to the recipient may be provided to the retailer system 104 and/or to the partner system(s) 110, thereby providing the retailer and/or partner(s) with a potential new customer (i.e., the recipient). In one or more embodiments, all or any portion of any information obtained related to the sender and/or the recipient is used by the gifting service system 112 to dynamically update historical data maintained by the gifting service 112, which may be used to dynamically update the machine learning models of the send offer analysis algorithm 120 and/or the gift options algorithm 122 by adding the obtained information in real-time to the training data sets for the machine learning models.

Figure 2:
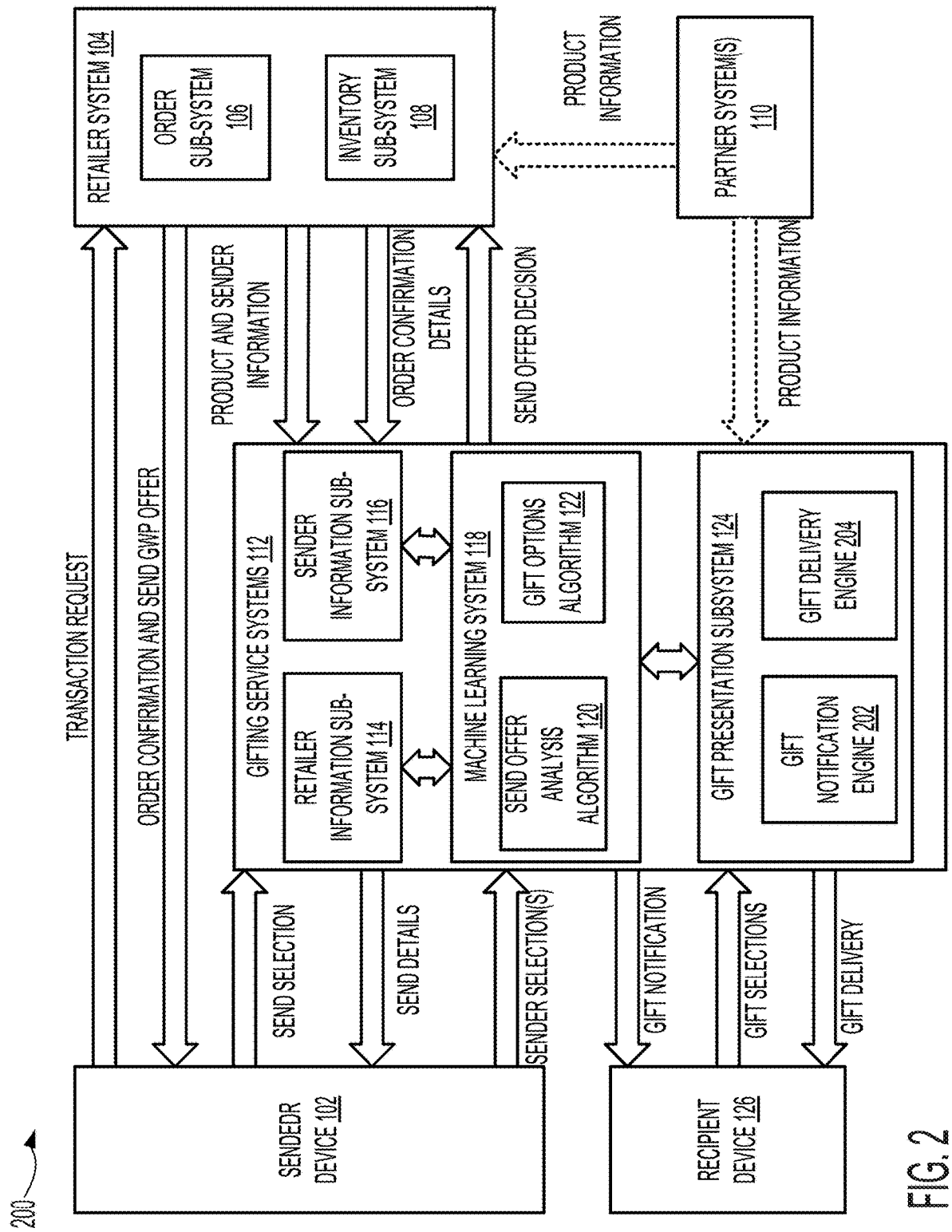
FIG. 2 shows an illustrative example of an environment in which a consumer conducts a transaction with a retailer, a determination is made as to whether the transaction qualifies for the receipt of an offer to send a gift to a separate recipient, information is obtained from the consumer related to sending a gift, information is obtained from an intended recipient of the gift to facilitate the delivery of the gift, and the gift is delivered.

FIG. 2 shows an illustrative example of an environment 200 in which a consumer (not shown) may be presented with an option to send a gift received as a result of a purchase from a retailer to a separate recipient (not shown), thereby becoming a sender of the gift. As described above, a consumer (not shown) may use a browser application (not shown) or other application (not shown) of a sender device 102 to interact with a retailer system 104 in order to see product offerings of a retailer associated with retailer system 104. In one or more embodiments, when the consumer, via the sender device 102, elects to purchase one or more products from the retailer system 104, order confirmation details are provided to a gifting service system 112 from the retailer system 104. Additionally, prior to and/or contemporaneous with the transmission of the order conformation details, the gifting service system 112 may receive product information related to one or more products of the retailer. The product information may include information about one or more products purchased by the consumer and/or about one or more products that may be offered to the consumer as a gift with a completed purchase. Product information may additionally or alternatively be provided to the gifting service system by one or more partner systems 110. The gifting service system may also receive or otherwise obtain sender information about one or more consumers that may qualify to receive a gift with purchase, and receive an offer to send the gift to a separate recipient.

In one or more embodiments, in response to receiving order confirmation details, as described above, the send offer analysis algorithm 120 of the machine learning system 118 of the gifting service system 112 may be invoked. The send offer analysis algorithm 120 may use information from the order confirmation details (e.g., product, product category, purchase price, date of purchase, etc.), product information (e.g., gift product inventory information) from the retailer information sub-system 114, and sender information from the sender information sub-system 116 in order to determine whether an offer should be presented to a consumer that has made a purchase from the retailer system 104. In one or more embodiments, the offer is an offer for the consumer to send a gift received as a result of the purchase to a separate recipient of the consumer's choosing. In one or more embodiments, the decision, which may be referred to as a send offer decision, is transmitted to the retailer system 104. In one or more embodiments, if the send offer analysis algorithm 120 determines that a purchase associated with order confirmation details, then the retailer system or the gifting service system transmits the offer to a sender device 102 associated with the consumer that made the purchase.

In one or more embodiments, the offer is transmitted to the sender device 102 along with an order confirmation that includes details related to the purchase made by the consumer. The order confirmation may be transmitted in any form (e.g., an email, webpage, text message, etc.). The offer for the consumer to send a gift received as a result of the purchase to a separate recipient that is presented with the order confirmation may include an interactive element (e.g., a button) with which the consumer may interact to select to begin the process of sending a gift to the separate recipient. In one or more embodiments, when the consumer selects to send a gift (thereby becoming a sender), the selection is transmitted to the gifting service system 112. In one or more embodiments, the gifting service system 112 then transmits to the sender device 102 one or more subsequent pages that provide the sender with one or more gift options determined by the gift options algorithm 122 (as discussed above in the description of FIG. 1), request a selection from among the gift options (if applicable), and request a recipient identifier that identifies an intended recipient and includes contact information for the recipient. The form of the contact information may be based on a particular type of communication channel, which may also be selected by the sender. In one or more embodiments, once the sender has made the requested selections and entered the requested information (collectively, sender selections), the sender selections are transmitted to the gifting service system 112.

In one or more embodiments, in response to receipt of the sender selections, a gift notification engine 202 of the gift presentation sub-system 124 generates a gift notification. The gift notification engine 202 may be implemented as an application or executable process of the gift presentation sub-system 124. In one or more embodiments, the gift notification includes an indication that the recipient has been sent a gift. The indication may or may not identify the sender of the gift (e.g., "Kelly got you a gift!"). The gift notification may include any other information without departing from the scope of embodiments described herein. As an example, the gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the gift notification may include explanatory information that provides the recipient with details related to the receipt of the gift (e.g., "You have received a gift. To redeem your gift, select the button above, and provide your address to have your gift shipped to you"). As another example, the gift notification may include information that provides the recipient with other details about the gift redemption process (e.g., that the recipient will have the option to exchange the gift for another gift, that the recipient will have the option to select certain customization options related to the gift, etc.).

As another example, the gift notification may include information indicating that the redemption of the gift is time sensitive (e.g., "You have 10 days to redeem this gift"). As another example, the gift notification may include an indication that gift quantities are limited, which may induce the recipient to begin the gift redemption process sooner rather than later. In one or more embodiments, the gift notification engine 202 transmits the gift notification to a recipient device 126 associated with the intended recipient of the gift. In one or more embodiments, the transmission of the gift notification is performed using a communication channel (e.g., email, text message, social media platform, etc.) selected by the sender In one or more embodiments, when the recipient selects to begin the process of redeeming the gift, the gifting service system 112 may present to the recipient a series of one or more pages that allow the recipient to accept the sender-selected gift, exchange the sender-selected gift for an alternate gift, select from among alternate gift options (which may have been determined by the gift options algorithm, as discussed above in the description of FIG. 1), select any relevant customization or other options related to the selected gift option, select to send a thank-you card to the sender, provide delivery details (e.g., preferred delivery channel, delivery destination details etc.), etc.

In one or more embodiments, all or any portion of the gift selections and other information provided by the recipient are received by a gift delivery engine 204 of the gift presentation sub-system 124. The gift delivery engine 204 may be implemented as an application or executable process of the gift presentation sub-system 124. In one or more embodiments, the gift delivery engine 204 is configured to orchestrate delivery of the gift to the recipient. In one or more embodiments, the gift delivery engine 204 processes all or any portion of the gift selections and other information provided by the recipient in response to the gift notification in order to orchestrate the delivery of the gift to the recipient. The gift delivery engine 204 may coordinate with a retailer associated with retailer system 104, and or a partner of the retailer associated with the partner system(s) 110, in order to obtain or otherwise reserve a particular product that is to serve as the gift that is to be delivered to the recipient associated with recipient device 126. Further, the gift delivery engine 204 may coordinate with one or more third-party entities in order to prepare the gift according to the various options selected by the sender and/or receiver. The third-party entities may include gift wrapping service providers, greeting card service providers, delivery services, etc. For example, if the sender has selected a gift option to include a customized card with the gift, the gift delivery engine 204 may coordinate with a greeting card service provider to provision the customized card that is to be included with the gift.

In one or more embodiments, the gift delivery engine 204 organizes the delivery of the gift pursuant to delivery options provided by the recipient. For example, if the recipient has selected an option to digitally deliver the gift to the recipient device 126, the gift delivery engine 204 may use an electronic address (e.g., e-mail address, etc.) provided by the recipient. Alternatively, if the recipient has selected an option to have the gift delivered to the recipient at a physical address, the gift delivery engine 204 may use a physical address provided by the recipient.

The gift delivery engine 204 may use the obtained delivery information, as well as any information regarding coordination among the retailer, partner, and/or any third-party entities for preparation and delivery of the gift. In one or more embodiments, the gift delivery engine 204 is configured to deliver the gift to the recipient associated with the recipient device 126. For example, if the recipient has selected an option to digitally deliver the gift to the recipient, the gift delivery engine 204 may transmit an electronic message that includes one or more redemption options (e.g., electronic gift card, link to a website associated with a retailer, the partner, or the gifting distribution system 112, etc.) for the gift to an electronic address (e.g., e-mail address, etc.) associated with the recipient and provided by the recipient and/or the sender. If the gift is to be physically delivered to the recipient, the gift delivery engine 204 may coordinate with a retailer system 104 or partner system 110 associated with the gift to prepare and deliver the gift to the recipient. If the gift is to be gift-wrapped and/or include a customized card or note, the gift delivery engine 204 may monitor the retailer system and any third-party entities to ensure that the gift is wrapped and that the requested card or note is included with the gift according to the selected gift options. In one or more embodiments, if the recipient selected to send a thank-you note to the sender for the gift, the gift delivery engine may transmit the thank-you note and/or coordinate with other entities (e.g., retailer, partner, third-party entity, etc.) to deliver the thank you note to the sender. In one or more embodiments, once the gift has been delivered to the recipient, all or any portion of the information associated with the recipient obtained from the sender, recipient, and/or any other source may be provided to the retailer and/or partner. In one or more embodiments, all or any portion of the information gained about the sender and/or the recipient may be stored by the gifting service system 112, and may be used, at least in part, in order to assess future purchases to determine if an offer to send a gift received with the purchase to a separate recipient should be provided to the purchaser, and/or what gift options should be presented to the sender and/or the recipient when such a gift is to be sent to a recipient.

Figure 3:
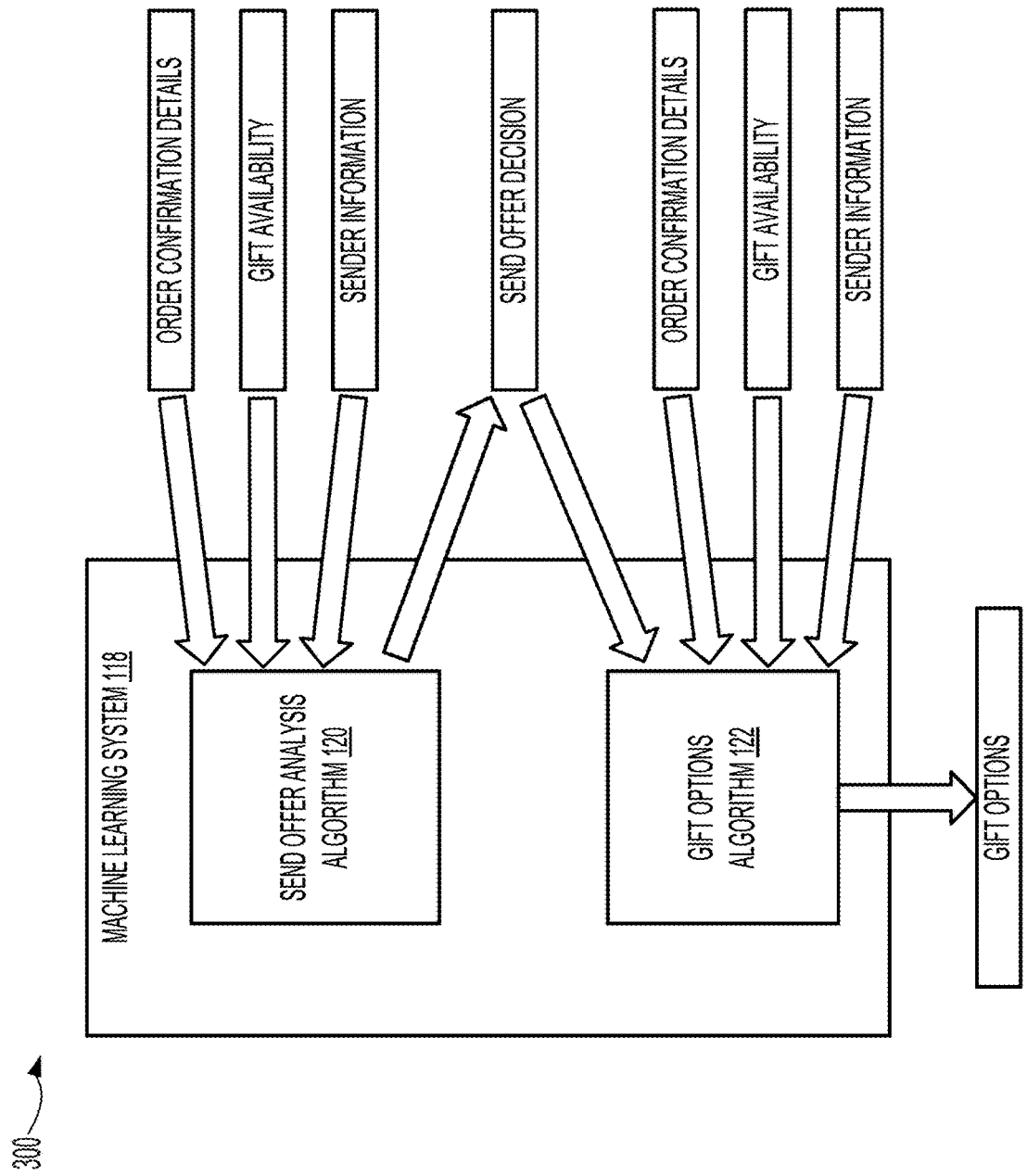
FIG. 3 shows an illustrative example of an environment in which a machine learning system implements and continuously updates machine learning algorithms used to generate contextual information for the creation of gift advertisements and to generate the one or more options for generating a gift object in accordance with at least one embodiment.

FIG. 3 shows an illustrative example of an environment 300 in which a machine learning system 118 implements and dynamically updates machine learning models of the send offer analysis algorithm 120 and/or the gift options algorithm 122. As described above, the send offer analysis algorithm 120 obtains information from a variety of sources as input to a machine learning model. Such sources may include order confirmation details, product information (e.g., names, descriptions, images, inventory levels (i.e., gift availability), etc.) related to products from a retailer and/or partner of the retailer that may be offered as gifts to a consumer that made a purchase, product information about one or more products that were purchased during a transaction for which order confirmation details were generated and provided to a gifting service system, and/or information about one or more consumers, including the consumer that made a purchase associated with the order confirmation details received by the gifting service system. Product information may have been received prior to and/or contemporaneously (i.e., in real-time) with the receipt of order confirmation details. Sender information may include information about the potential sender (i.e., a consumer that made a purchase from a retailer) received as part of or along with the order confirmation details. Sender information may also include information about the potential sender obtained by the gifting service system before and/or after receiving order confirmation details. As an example, the gifting service system may have previously interacted with the potential sender, and stored information obtained during the interaction. As another example, the gifting service system may have previously obtained, or obtain in real-time, information associated with the potential sender (e.g., demographic information, location information, information related to online content viewed or otherwise accessed, etc.) through scraping techniques, cookies, browser extensions, etc.

Real-time and historical sender information may be combined the with product information (e.g., purchased products, potential gifts, etc.) and order confirmation details, and used as input to the trained machine learning model to determine whether to provide an offer to a purchaser to send a gift received with the purchase to a separate recipient. In one or more embodiments, responses from a potential sender, including whether or not the potential sender elected to send a gift to a separate recipient, gift selections, and/or any other selections and/or information provided by the sender may be stored. Such information may be used, at least in part, as part of a training data set to continuously and dynamically train the machine learning model to better predict when a purchaser should receive an offer to send a gift with purchase to a separate recipient. For example, the product information, order confirmation details, and sender information may be associated with the outcome (e.g., whether the purchaser selected to send a gift, what gift option was selected to send, etc.) of offering the option to send a gift with purchase, and the associated sets of information may be aggregated with other such associated sets of information and used to train the machine learning algorithm, which such training being performed continuously as additional such associated information sets are obtained by the gifting service system.

In one or more embodiments, the gift options algorithm 122 may also include a machine learning model for determining which gift options to present to a sender and/or to a recipient. As described above, the gift options algorithm 122 obtains information from a variety of sources as input to such a machine learning model. Such sources may include order confirmation details, product information (e.g., names, descriptions, images, inventory levels (i.e., gift availability), etc.) related to products from a retailer and/or partner of the retailer that may be offered as gifts to a consumer that made a purchase or delivered to an intended recipient, product information about one or more products that were purchased during a transaction for which order confirmation details were generated and provided to a gifting service system, information about one or more consumers, including a consumer that made a purchase associated with order confirmation details received by the gifting service system, and/or information associated with the intended recipient of a gift. Product information may have been received prior to and/or contemporaneously with the receipt of order confirmation details. Sender information may include information about the potential sender (i.e., a consumer that made a purchase from a retailer) received as part of or along with the order confirmation details. Sender information may also include information about the potential sender obtained by the gifting service system before and/or after receiving order confirmation details. As an example, the gifting service system may have previously interacted with the potential sender, and stored information obtained during the interaction. As another example, the gifting service system may have previously obtained, or obtain in real-time, information associated with the potential sender (e.g., demographic information, location information, information related to online content viewed or otherwise accessed, etc.) through scraping techniques, cookies, browser extensions, etc. Recipient information may include information about an intended recipient received from a sender and/or any other information about a recipient that may have been obtained by the gifting service system before or after receiving order confirmation details.

Real-time and historical sender information and/or recipient may be combined the with product information (e.g., purchased products, potential gifts, etc.) and order confirmation details, and used as input to the trained machine learning model to determine what gift options to present to a sender (i.e., the consumer that made a purchase from the retailer) or to a recipient, which may or may not be the same gift options. In one or more embodiments, responses from a potential sender, including whether or not the potential sender elected to send a gift to a separate recipient, gift selections made, and/or any other selections and/or information provided by the sender may be stored. Such information may be used, at least in part, as part of a training data set to continuously and dynamically train the machine learning model to better predict what gift options should be presented to a sender and/or a recipient. For example, the product information, order confirmation details, sender information, and/or information about the recipient may be associated with the outcome (e.g., did purchaser send gift, what gift option was selected to send, etc.) of offering the option to send a gift with purchase, and the associated sets of information may be aggregated with other such associated sets of information and used to train the machine learning algorithm. Such training may be performed continuously as additional such associated information sets are obtained by the gifting service system and added to the training data set for the machine learning model. Additionally, in one or more embodiments, responses, selections, and/or information received from a recipient, combined with outcomes of notifying a recipient of a gift (e.g., did the recipient redeem a gift, what gift option a recipient selects, etc.) may be added to the training data set for the machine learning model of the gift options algorithm 122, which is continuously trained by adding such information to the training data set as it is obtained.

Figure 4:
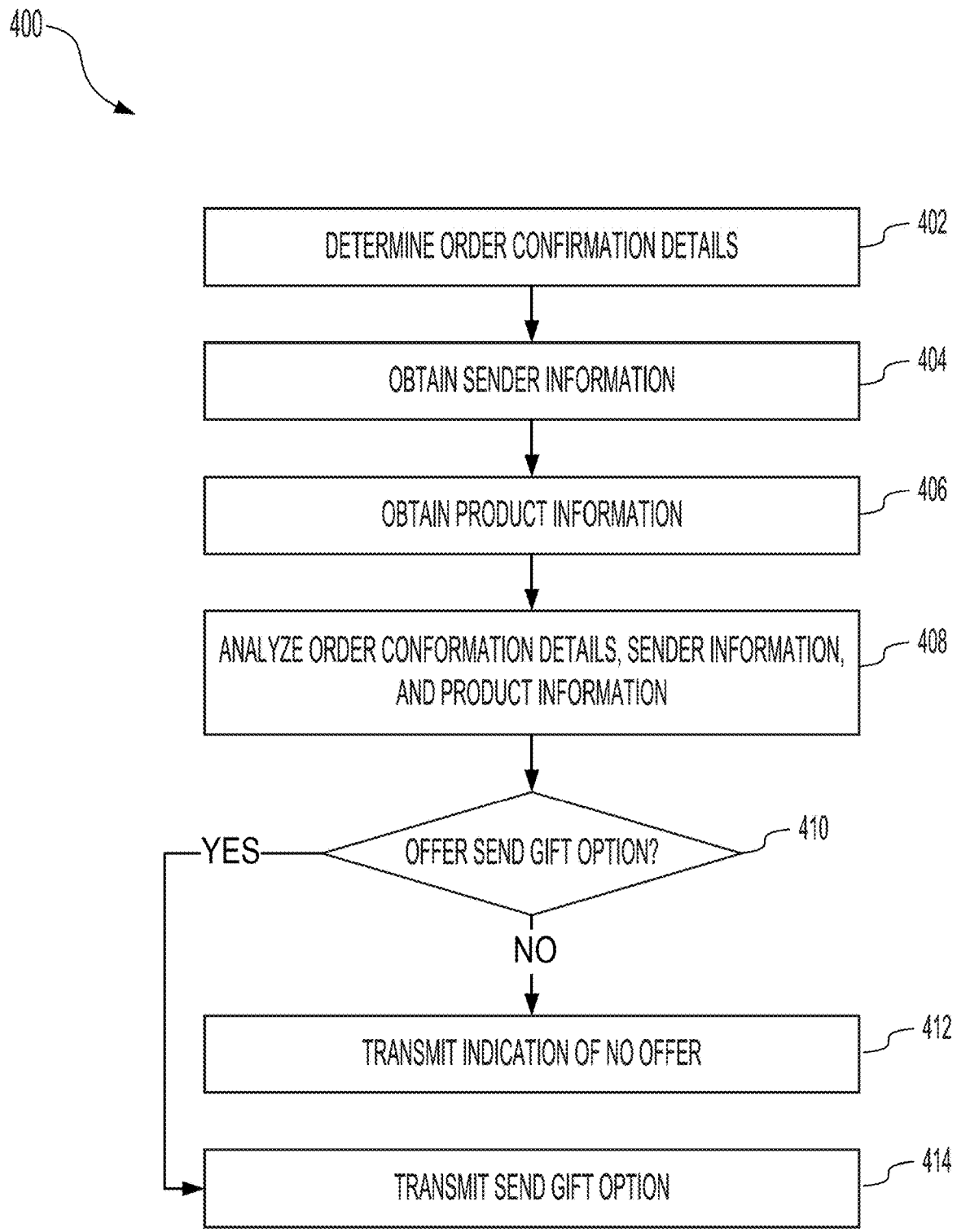
FIG. 4 shows an illustrative example of a process for determining whether a transaction qualifies for the receipt of an offer to send a gift in accordance with at least one embodiment.

FIG. 4 shows an illustrative example of a process 400 for determining whether to provide a consumer with an offer to send a gift received as a result of a purchase to a separate recipient in accordance with one or more embodiments described herein. The process 400 may be performed, for example, by a gifting service system, such as gifting service system 112 described above at least in conjunction with FIG. 1.

In one or more embodiments, prior to step 402 of process 400, a consumer used a sender device (e.g., sender device 102, described above) to access a retailer system (e.g., retailer system 104, described above) over a network (e.g., network 1322, shown in FIG. 13 and described below). A retailer, via the retailer system, makes products (e.g., goods and/or services) available to consumers for viewing and purchase. For example, the retailer system may host a website with any number of webpages that include any number of product offerings, and a consumer may use a browser application of the sender device to access the website of the retailer. All or any portion of the products offered for purchase by the retailer may be presented along with an advertisement indicating that if the product is purchased, a gift will be received with the purchase. As an example, an advertisement of a gift with purchase may be presented with products of one or more brands. As another example, an advertisement of a gift with purchase may be presented with all products, and be accompanied by an indication that the offer of a gift with purchase is for a limited time only. The decision of a consumer to purchase a product from the retailer may be influenced by the offer to receive a gift with the purchase, which may improve the sales conversion rate for the retailer. Alternatively, an advertisement related to a gift received as a result of purchase may not be presented to the consumer until the purchase has been completed.

To purchase one or more products from the retailer, the consumer making the purchase may, from the sender device, initiate a transaction with the retailer system to place an order to purchase one or more products. For example, the consumer may have placed one or more products in an online shopping cart, and hit a button to proceed to checkout, thereby initiating the transaction. The consumer may be asked to provide various items of information, such as shipping address, payment information (e.g., credit card information and billing address), delivery options, etc. Once the requisite information has been entered, and the order reviewed for accuracy, the consumer may then place the order, thereby submitting the transaction request to the retailer system as an order for the one or more products. In response to the transaction request, order confirmation details are generated by the retailer system.

At step 402, order confirmation details are determined by a gifting service system (e.g., gifting service system 112 of FIG. 1). In one or more embodiments, order confirmation details are generated by a retailer system (e.g., retailer system 104 of FIG. 1) when a transaction is completed (i.e., a purchase is made) by a consumer. Order confirmation details may include any information associated with the transaction (e.g., purchase), such as, for example, identification of one or more purchased products, categorization of the one or more purchased products, purchase price, time and/or date of purchase, etc. In one or more embodiments, order confirmation details are received at the gifting services system from the retailer system. Additionally or alternatively, the gifting service system may obtain the order confirmation details by monitoring the retailer system for transactions, and obtaining order confirmation details when a transaction is detected.

At step 404, sender information is obtained by the gifting service system (e.g., gifting service system 112 of FIG. 1). In one or more embodiments, sender information includes information about the potential sender of a gift (i.e., the consumer that made the purchase for which order confirmation details were generated by the retailer system). Sender information may include information about the sender received from the retailer system as part of and/or separate from the order confirmation details. Sender information other than what is included in the order confirmation details may be obtained by the gifting service system prior to determining order confirmation details (e.g., historical sender information) and/or in real-time after receiving order confirmation details related to the transaction. Sender information may also include historical information about one or more consumers other than the consumer that made the purchase associated with the order confirmation details received in step 402. Sender information may, for example, include information identifying a sender, demographic information associated with a sender, a geographic location of a sender, etc. Sender information may be obtained from any source, such as via monitoring internet activity (e.g., via cookies, browser plugins, etc.), social media sites, search history, past purchase history (e.g., from the retailer and/or other retailers), user profiles on multimedia sites, etc. Sender information may be stored by the gifting service system with the information related to each potential sender associated in the storage (e.g., as a sender profile) such that the historical and real-time sender information obtained by the gifting service system may be collectively obtained when a sender associated with the order confirmation details determined in step 402 is identified.

At step 406, product information is obtained. In one or more embodiments, product information is obtained by a gifting service system (e.g., gifting service system 112 of FIG. 1). Product information may be any information related to any product or gift offering that is available from a retailer and/or a partner of a retailer. In one or more embodiments, product information includes inventory information related to available potential gift options. Product information may include information associated with one or more products purchased during the transaction. For example, the order confirmation details may include an identifier of a product (e.g., a product number) that was purchased, and the identifier may be used to obtain additional information about the product from product information previously provided by a retailer system or partner system (e.g., product name, product category, pricing information, product brand, size, color, etc.). Product information may include associations between certain products and one or more gift options. As an example, product information may include an association between products offered by the retailer of a particular brand and one or more gift options from the retailer and/or a partner of the retailer that may be offered as a gift with purchase when a product of the brand is purchased from the retailer by a consumer. As another example, product information may include an association between products offered by the retailer of a particular brand and one or more gift options from the retailer that may be offered as a gift with purchase when a product of the brand is purchased from the retailer by a consumer.

At step 408, the order confirmation details, sender information, and product information are analyzed by the gifting service system (e.g., gifting service system 112 of FIG. 1). In one or more embodiments, the order confirmation details, sender information, and product information are analyzed in order to determine whether a given transaction by which a consumer purchased one or more products from a retailer qualifies to receive an offer to send a gift received as a result of the purchase to a separate recipient. In one or more embodiments, the analysis includes evaluating any number of rules, individually or in any combination, as part of a send offer analysis algorithm (e.g., send offer analysis algorithm 120 of FIG. 1).

As an example, the send offer analysis algorithm may include a rule that indicates that any purchase that includes a purchase of a product of a particular brand qualifies to receive an offer to send a gift received as a result of the purchase to a separate recipient.

The send offer analysis algorithm may include rules that indicate that a gift with purchase will be offered when the purchase is over a certain purchase price, or within a certain price range. For example, the send offer analysis algorithm may include a rule that a purchase of more than $150 qualifies to receive an offer to send a gift received as a result of the purchase to a separate recipient.

The send offer analysis algorithm may include rules that indicate that a purchase made within a certain data range qualify as a gift with purchase. For example, the send offer analysis algorithm may include a rule that any purchase made in a certain 60 day window qualifies to receive an offer to send a gift received as a result of the purchase to a separate recipient.

The send offer analysis algorithm may include rules that indicate that a purchase made by a consumer having certain demographic characteristics qualifies for a gift with purchase. For example, the send offer analysis algorithm may include a rule that any purchase made by a consumer in a certain geographic region, that is of a certain age, that is married, etc. qualifies to receive an offer to send a gift received as a result of the purchase to a separate recipient.

The send offer analysis algorithm may include logic that indicates that a purchase qualifies for a gift with purchase only when such gifts exist in sufficient quantity in the inventory of a retailer associated with the retailer system. For example, a retailer may have certain products in inventory that they would like to clear from their inventory. In such a scenario, rather than use the time, effort, and expense associated with moving the products to a secondary market (e.g., factory outlet, auction house, etc.), the retailer may choose to instead allow the products to be offered as gifts to consumers who purchase other products from the retailer. Thus, at any given time, a retailer may have any number of different products that are to be offered as gifts, and each such product may exist in different quantities. The send offer analysis algorithm may therefore analyze the inventory information of the retailer, received as part of the product information from the retailer system, to determine whether any such products exist in a quantity range that the retailer has designated as the range within which the product should be offered as a gift with purchase (e.g., if any quantity greater than zero exists for a product, it may be offered as a gift with purchase). In one or more embodiments, if any such products are available in an appropriate quantity at the time a purchase is made, then the purchase associated with the order confirmation details qualifies to receive an offer to send a gift received as a result of the purchase to a separate recipient.

In one or more embodiments, the above-described rules, and/or any other such rules, may be evaluated by the send offer analysis algorithm 120 in combination to determine whether a given purchase associated with received order confirmation details qualifies for a gift with purchase As an example, a combination of such rules may indicate, during evaluation of order confirmation details, product information, and sender information, that a purchase of a particular product over a certain price, from a particular brand, within a given sixty day period, qualifies to receive an offer to send a gift received as a result of the purchase to a separate recipient, so long as any products to be offered as gifts exist in the inventory of a retailer.

In one or more embodiments, the analysis of the order confirmation details, product information, and sender information is performed using a machine learning model of the send offer analysis algorithm, which takes the aforementioned information as input and, as an output, generates a decision as to whether a purchase associated with the order details qualifies for an offer to send a gift received as a result of the purchase to a separate recipient. Such a machine learning model may be trained using a training data set that includes historical data about consumers that previously made purchases, details related to the purchase, whether an offer to send a gift to a separate recipient was presented to the consumer after a purchase was made, whether the consumer elected to become a sender by sending the gift received with purchase, whether the recipient redeemed the gift, and/or whether the recipient became a customer of the retailer and/or a partner of the retailer. As an example, the trained machine learning model may use the order confirmation details, product information, and sender information to predict a likelihood that the consumer, when presented with an offer to send a gift to a separate recipient, will select to send the gift, and only when the likelihood is above a defined threshold is the offer to send a gift presented to the consumer. In one or more embodiments, the machine learning model of the send offer analysis algorithm is used instead of evaluating one or more rules. In one or more embodiments, the machine learning model of the send offer analysis algorithm is used in conjunction with one or more rules. As an example, the send offer analysis algorithm may first evaluate a rule that a gift with purchase may be offered when a particular brand of product is purchased. When the order confirmation details and/or product information indicate that a product of the brand was purchased, the machine learning model may then be used to determine the likelihood of the consumer sending a gift, with only consumers that both purchased a product of the particular brand and have a likelihood of sending a gift that is over a defined threshold being provided with an offer to send the gift.

At step 410, based on the analysis performed in step 408, a determination is made as to whether the transaction associated with the order details determined in step 402 qualifies for an offer to send a gift received as a result of the purchase to a separate recipient. In one or more embodiments, if the decision is to not send the offer, the process continues to step 412. In one or more embodiments, if the decision is to send the offer, the process continues to step 414.

At step 412, the decision not to provide an offer to send a gift to the consumer that made a purchase from the retailer is transmitted. In one or more embodiments, the decision not to send the offer is transmitted from the gifting service system to the retailer system. In one or more embodiments, in response to receiving a decision not to send an offer to send a gift to a separate recipient is received by the retailer system, the retailer system may proceed to provide an order confirmation to the consumer without the offer. In one or more embodiments, the decision that the offer to send a gift should not be provided to the consumer may be stored, along with all or any portion of the results of the analysis and the information on which the analysis was based, and the information may be added to training data for a machine learning model of the send offer analysis algorithm, such that the machine learning model is dynamically updated.

At step 414, the decision to provide an offer to the consumer to send a gift received as a result of the purchase associated with the order confirmation details determined in step 402 is transmitted. In one or more embodiments, the decision to provide the offer is transmitted from the gifting service system to the retailer system from which the purchase was made. In one or more embodiments, the retailer system, in response to receiving the decision that the offer should be provided to the consumer, generates an order confirmation (e.g., order confirmation email, order confirmation webpage, etc.), includes the offer as part of the order confirmation, and provides the order confirmation with the offer to the consumer. The offer may be included with the order confirmation in any suitable form. For example, the offer may include an indication to the consumer that the consumer has the option to send a gift received as a result of the purchase associated with the order confirmation details to a separate recipient, along with an interactive element (e.g., a button, a text hyperlink, etc.) that the consumer may select to initiate the process of sending the gift to the separate recipient.

In one or more embodiments, rather than the offer being added to the order confirmation by the retailer system, the offer may be added to the order confirmation by the gifting service system. For example, the retailer system may provide an order confirmation webpage to the consumer with the order confirmation details after the consumer completes the transaction to purchase one or more products. In such a scenario, the webpage may include code that interacts with the gifting service system, and when the decision is to provide the offer to send a gift to a separate recipient to the consumer, the content of the offer is inserted into the page by the gifting service system via the code of the webpage that facilitates such an insertion. An order confirmation that includes an offer to send a gift to a separate recipient may be provided to a consumer in more than one form. For example, the order confirmation and offer may be presented as a webpage, and also presented in the form of a separately sent email.

In one or more embodiments, the decision that the offer to send a gift should be provided to the consumer may be stored, along with all or any portion of the results of the analysis and the information on which the analysis was based, and the information may be added to training data for a machine learning model of the send offer analysis algorithm, such that the machine learning model is dynamically updated.

Figure 5:
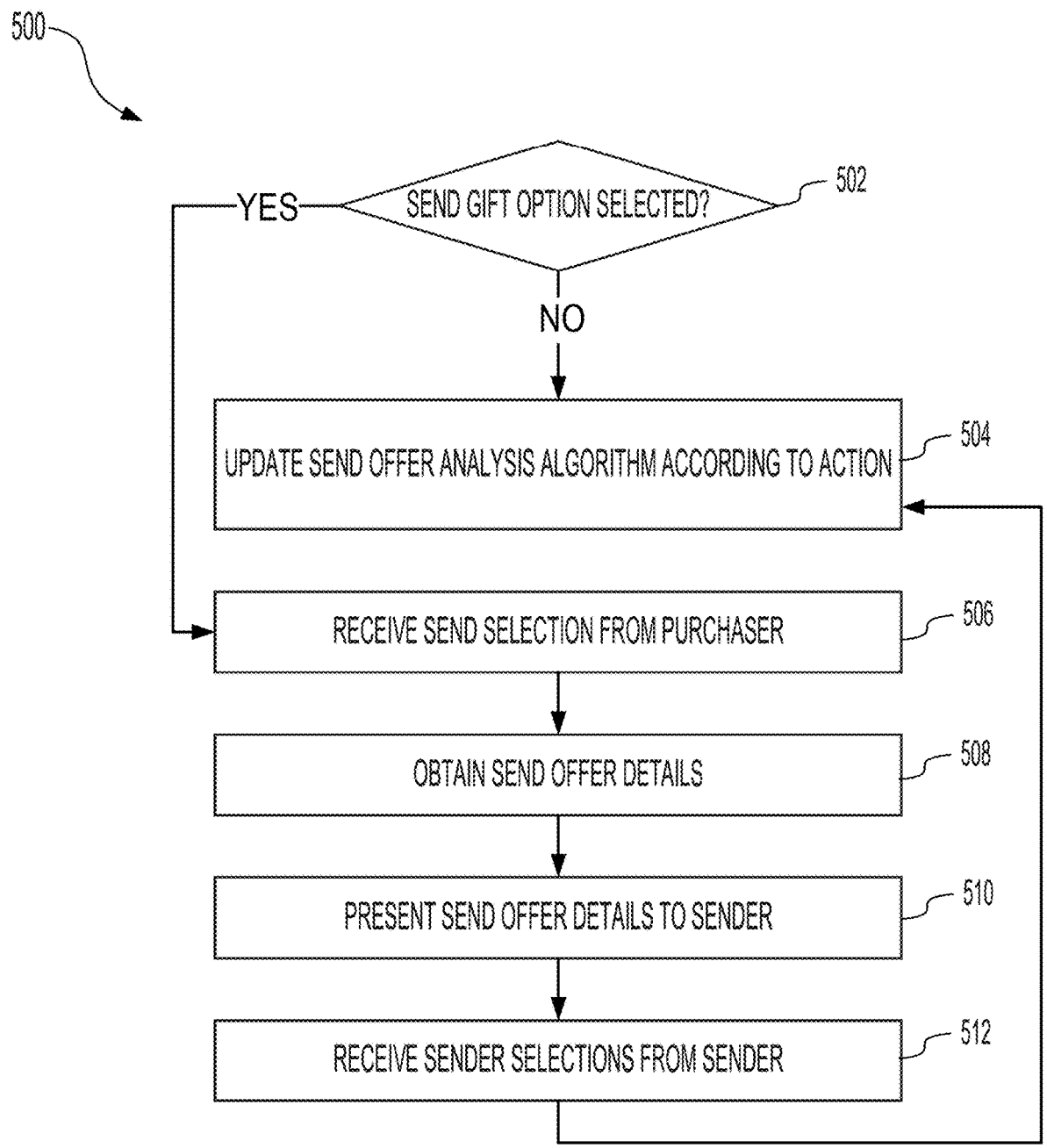
FIG. 5 shows an illustrative example of a process for obtaining selections and information from a consumer for sending a gift to a separate recipient in accordance with at least one embodiment.

FIG. 5 shows an illustrative example of a process 500 for interacting with a consumer to receive selections and information related to sending a gift received as a result of a purchase to a separate recipient in accordance with one or more embodiments described herein. The process 500 may be performed by a gifting service system (e.g., gifting service system 112 shown in FIG. 1 and described above).

In one or more embodiments, prior to step 502 of process 500, the process 400 of FIG. 4 has occurred, and a decision was made to provide to a consumer an offer to send a gift received as a result of a purchase to a separate recipient. As such, order details were provided to the consumer that made the purchase, along with the offer to send a gift.

At step 502, a determination is made as to whether the consumer selected to send a gift received as a result of the purchase to a separate recipient. In one or more embodiments, the consumer may select to send the gift to a separate recipient by interacting with an interactive element (e.g., a button, a text hyperlink, etc.) presented as part of the offer included in an order confirmation. In one or more embodiments, the consumer may decline the offer to send a gift. As an example, the offer may include a question as to whether the consumer wants to send the gift to a separate recipient, and interactive elements for "Yes" and "No". In such a scenario, the consumer may actively decline the offer by selecting "No". As another example, the offer may be presented along with a time window in which the offer will remain valid (e.g., "This offer will remain valid for 10 days."), and the consumer may passively decline the offer by not selecting to send the gift within the designated time window. As another example, the offer may be presented as part of a webpage that includes the order confirmation, and the consumer may decline by navigating away from the order confirmation page. In one or more embodiments, if the consumer selects to send the gift to a separate recipient, the process continues to step 506. In one or more embodiments, if the consumer declines the offer (e.g., actively or passively), then the process continues to step 504.

At step 504, the send offer analysis algorithm is dynamically updated with the result of the consumer declining the option to send the gift. In one or more embodiments, the declining of the offer is associated with the sender information, the product details, and the order confirmation details used to decide to provide the offer to the consumer, and the associated information set is added to the training data for a machine learning model of the send offer analysis algorithm, such that the machine learning model is dynamically updated. In one or more embodiments, by adding such results to the training data for the machine learning model of the send offer analysis algorithm, the machine learning model may be continuously and dynamically updated to improve its ability to predict the likelihood that a consumer will select to send a gift to a separate recipient when presented with an offer to do so.

At step 506, the send selection is received from the consumer. In one or more embodiments, the send selection is a selection by the consumer to begin the process of sending a gift received as a result of a purchase from a retailer to a separate recipient. In one or more embodiments, the send selection is received by a gifting service system (e.g., the gifting service system 112 of FIG. 1) from a sender device (e.g., sender device 102 of FIG. 1) associated with the consumer that made the purchase. As an example, the consumer may select a button included in the offer to provide an indication to the gifting service system that the consumer would like to send a gift to a separate recipient.

At step 508, send offer details are obtained. In one or more embodiments, the send offer details are obtained by the gifting service system (e.g., gifting service system 112 of FIG. 1). In one or more embodiments, the send offer details include a series of one or more pages to be presented to the consumer via a sender device that include information related to sending the gift, as well as requests for various items of information to be provided by the sender.

In one or more embodiments, the send offer details include one or more gift options. In one or more embodiments, the gift options are determined, at least in part, by a gift options algorithm (e.g., gift options algorithm 122 of FIG. 1) of the gifting service system. In one or more embodiments, the purchase made by the consumer qualifies for one particular gift, and only details related to that gift are obtained as part of the send offer details. For example, the gift options algorithm may dynamically assess the order confirmation details, product information, and/or sender information to determine that a particular brand of product was purchased, and that any purchase of that particular brand should receive as a gift option a particular product of the retailer or supplied by a partner of the retailer. In other embodiments, the gift options algorithm may dynamically determine more than one gift option to present to the consumer as part of the send offer details. As an example, the retailer from which the purchase was made may have ten products that they prefer to give as gifts with purchase to clear the products from inventory rather than move the products to a secondary market. In such a scenario, the gift options algorithm may dynamically assess the order confirmation details, product information, and/or sender information to determine which of the ten products the purchase qualifies to receive as gift options (e.g., four of the ten products should be offered as gift options for purchases between $100 and $200).

In one or more embodiments, the one or more gift options to be presented to the sender (i.e., the consumer that made the purchase and selected to send a gift) depends, at least in part, on the timing of when the sender selects to send the gift. As an example, the one or more gift options for which the purchase qualifies may be derived from products in the inventory, and the timing of the selection may dictate what such products exist in the inventory of the retailer at the time of the selection.

In one or more embodiments, the send offer details also include requests for information. As an example, the send offer details may include a request for the sender to select from among the gift options presented. As another example, the send offer details may include a request for the sender to provide recipient identifier information, such as the name and contact information of the intended recipient of the gift to be sent on behalf of the sender. As another example, the send offer details may include a request for the sender to select a communication channel (e.g., email, text message, messenger service, social media, etc.) through which the intended recipient will be notified of the gift. In one or more embodiments, the contact information portion of the requested recipient identifier that the sender is requested to provide depends on the communication channel the sender selects (e.g., email address when email is selected as the communication channel). As another example, the send offer details may request that the sender optionally add a message for the intended recipient. As another example, the send offer details may include a request that the sender optionally select from among various virtual gift wrap options that will initially conceal the gift in a gift notification provided to the intended recipient.

At step 510, the send offer details obtained in step 508 are presented to the sender. In one or more embodiments, the gifting service system (e.g., the gifting service system 112 of FIG. 1) transmits the send offer details to a sender device (e.g., sender device 102 of FIG. 1) associated with the sender. In one or more embodiments, the send offer details are presented to the consumer as a series of one or more pages (e.g., webpages) that convey the information related to the one or more gift options and the request for various items of information and selections from the sender. In one or more embodiments, the presentation of the one or more gift options to the sender may include names, details, and/or images of the one or more gift options.

At step 512, sender selections are received from the sender. In one or more embodiments, the sender selections are received by the gifting service system (e.g., gifting service system 112 of FIG. 1) from a sender device (e.g., sender device 102 of FIG. 1) associated with the sender. In one or more embodiments, the sender selections include a selection of the gift to be offered to the intended recipient, the recipient identifier (e.g., name and contact information), the communication channel to be used to notify the intended recipient of the gift, and any other selections or information items that were requested from the sender.

In one or more embodiments, after step 512, the process returns to step 504, and the gift options algorithm is updated with the sender selections. In one or more embodiments, the acceptance of the offer and sender selections are associated with the sender information, the product details, and the order confirmation details, and the associated information set is added to the training data for a machine learning model of the gift options algorithm, such that the machine learning model is dynamically updated. In one or more embodiments, by dynamically adding such results to the training data for the machine learning model of the gift options algorithm, the machine learning model may be continuously updated to improve its ability to predict the likelihood that a consumer will select to send a gift to a separate recipient when presented with an offer to do so by predicting gift options the sender is more likely to send.

Figure 6:
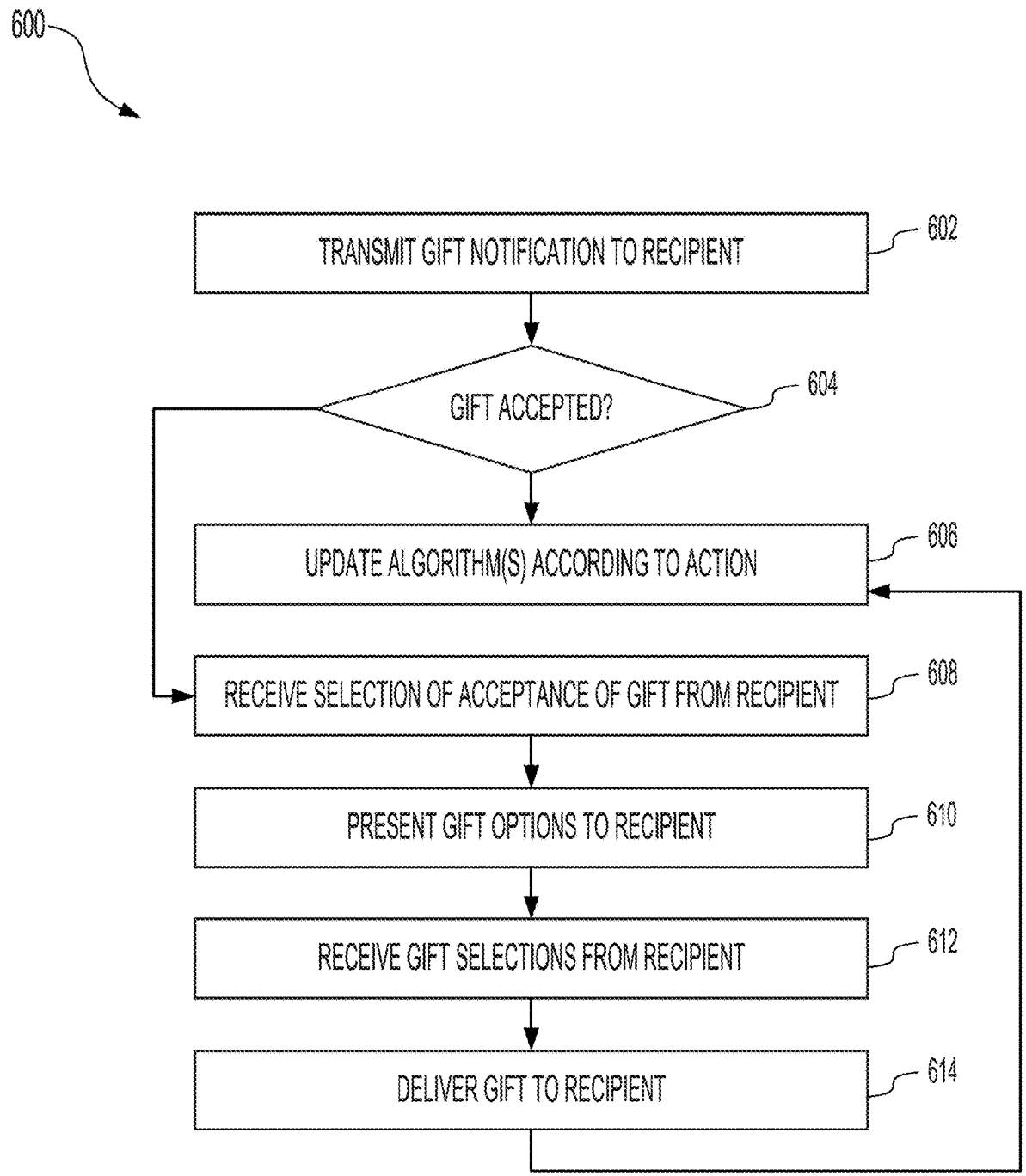
FIG. 6 shows an illustrative example of a process for obtaining selections and information from a recipient to facilitate delivery of a gift in accordance with at least one embodiment.

FIG. 6 shows an illustrative example of a process 600 for interacting with an intended recipient of a gift received by a sender as the result of a purchase made by the sender in order to notify the recipient of the gift and to deliver the gift in accordance with one or more embodiments described herein.

The process 600 may be performed by a gifting service system (e.g., gifting service system 112 shown in FIG. 1 and described above).

In one or more embodiments, prior to step 602 of process 600, a consumer completed a transaction to purchase one or more products from a retailer. The purchase was dynamically determined to qualify for the consumer to be presented with an option to send a gift received as a result of the purchase to a separate recipient (see, e.g., FIG. 4). The consumer selected to send a gift, thereby becoming a sender. The gifting service system interacted with the sender via a sender device in order to receive various sender selections and sender-provided information (e.g., a selection of a gift to be sent, a recipient identifier that included the name and contact information of the intended recipient, a communication channel through which to notify the intended recipient of the gift, etc.) (see, e.g., FIG. 5).

At step 602, a gift notification is transmitted to the intended recipient. In one or more embodiments, the gift notification is transmitted from a gifting service system (e.g., gifting service system 112 of FIG. 1) to a recipient device (e.g., recipient device 126 of FIG. 1) associated with the intended recipient. In one or more embodiments, the gift notification includes an indication that the recipient has been sent a gift. The indication may or may not identify the sender of the gift (e.g., "Kelly got you a gift!"). The gift notification may include any other information without departing from the scope of embodiments described herein. As an example, the gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the gift notification may include explanatory information that provides the recipient with details related to the receipt of the gift (e.g., "You have received a gift. To redeem your gift, select the button above, and provide your address to have your gift shipped to you"). As another example, the gift notification may include information that provides the recipient with other details about the gift redemption process (e.g., that the recipient will have the option to exchange the gift for another gift, that the recipient will have the option to select certain customization options related to the gift, etc.).

In one or more embodiments, the gift notification is transmitted to the recipient device using a communication channel selected by the sender, which may include using at least a portion of the recipient identifier provided by the sender. For example, if email was selected as the communication channel, the gift notification may be transmitted using an email address of the recipient provided by the sender. As another example, if text message was selected as the communication channel, then a phone number of the recipient provided by the sender and associated with the recipient device may be used to send the gift notification.

At step 604, a determination is made as to whether the recipient accepts the gift. In one or more embodiments, the recipient may select to see the gift selected by the sender, and then select to redeem the gift. In one or more embodiments, the recipient may select to accept the gift by interacting with an interactive element (e.g., a button, a text hyperlink, etc.) presented as part of the gift notification. In one or more embodiments, the recipient may decline to accept the gift. As an example, the notification may include a question as to whether the recipient wants to see and/or redeem the gift, and interactive elements for "Yes" and "No". In such a scenario, the recipient may actively decline the gift by selecting "No". As another example, the gift notification may be presented along with a time window in which the gift will remain available (e.g., "This gift must be redeemed within 10 days."), and the recipient may passively decline the offer by not selecting to redeem the gift within the designated time window. In one or more embodiments, if the recipient selects to redeem the gift, the process continues to step 608. In one or more embodiments, if the recipient declines the gift (e.g., actively or passively), then the process continues to step 606.

At step 606, the send offer analysis algorithm and/or the gift options algorithm may be dynamically updated with the result of the recipient declining the gift. In one or more embodiments, the declining of the gift is associated with the sender information, the product details, recipient information, and the order confirmation details, and the associated information set is added to the training data for a machine learning models of the send offer analysis algorithm and/or the gift options algorithm, such that the machine learning model is dynamically updated. In one or more embodiments, by dynamically adding such results to the training data for the machine learning models of the send offer analysis algorithm and/or the gift options algorithm, the machine learning models may be continuously updated to improve their ability to predict the likelihood that a recipient will select to redeem a gift when presented with an offer to do so.

At step 608, an indication of acceptance of the gift is received. In one or more embodiments, the gift acceptance is received by the gifting service system (e.g., gifting service system 112 of FIG. 1) from a recipient device (e.g., recipient device 126 of FIG. 1) associated with the recipient. In one or more embodiments, the gift acceptance indicates that the recipient desires to continue with the gift redemption process. As an example, the recipient may select a button included in the gift notification to provide an indication to the gifting service system that the recipient would like to redeem the gift.

At step 610, gift options are presented to the recipient. In one or more embodiments, the gift options include requests for various selections be made and information be provided by the recipient. In one or more embodiments, the gift options are presented to the recipient in a series of one or more pages (e.g., webpages) that each request all or any portion of the selections and information needed to deliver a gift to the recipient. In one or more embodiments, the sender-selected gift is the only gift offered to the recipient. In other embodiments, the gift options include one or more alternate gift options that the recipient may select to exchange for the sender-selected gift. In one or more embodiments, the gift options include a request for the recipient to select from among the sender-selected gift and the alternate gift options. In one or more embodiments, once the sender has selected the sender-selected gift or to exchange the sender-selected gift for an alternate gift option, the recipient may be presented with a request to select various customization options for the selected gift (e.g., size, color, etc.). In one or more embodiments, the alternate gift options presented to the recipient are generated by the gift options algorithm. The alternate gift options may or may not be the same as the alternate gift options that the sender was presented to select from among for sending a gift. As an example, the gifting service algorithm may include a predictive machine learning model that takes as input sender information, product information, inventory information, and/or information associated with the intended recipient to predict one or more alternate gifts that increase the likelihood that the recipient will select to redeem a gift, which may, in turn, increase the likelihood that the retailer gains the recipient as a potential customer.

In one or more embodiments, the one or more gift options presented to the recipient may depend on when the recipient selects to redeem a gift (i.e., the timing of the selection to redeem the gift). As an example, the gifting service system may transmit the gift notification in the form of an email. In such a scenario, the recipient may not immediately open the email, or may open the email but not immediately select to redeem the gift. Thus, the one or more alternate gift options that would be presented to the recipient may have changed since the time of the purchase. For example, some or all of the gift options that would have been presented if the consumer had elected to send a gift near the time of the purchase may no longer be available. Therefore, the gift options algorithm may be invoked at the time the recipient selects to redeem the gift in order to present gift options that are available at the time of the selection. In one or more embodiments, the gift options presented to the recipient also include additional request for information (e.g., address to send the gift to, preferred delivery options, etc.).

At step 612, gift selections are received from the recipient. In one or more embodiments, the gift selections are received by the gifting service system (e.g., gifting service system 112 of FIG. 1) from a recipient device (e.g., recipient device 126 of FIG. 1) associated with the recipient. In one or more embodiments, the gift selections include, but are not limited to, a selection from among the sender-selected gift and any alternate gift options, a preferred delivery method, information to facilitate delivery of the gift via the preferred delivery method, and any customization options associated with the selected gift.

At step 614, the gift is delivered to the recipient. In one or more embodiments, based at least in part on the gift selections received in step 612, the gifting service system initiates delivery of the selected gift to the recipient. The method of delivery may be based on a selection made by the recipient during the gift redemption process by which the recipient indicated a preferred method of delivery. As an example, the gift may be a gift card, and the recipient may have selected to receive the gift card as a virtual gift card delivered via email. As another example, the gift may be a physical object, and the recipient may have provided a physical address to which the gift is shipped. The gifting service system may perform the delivery of the gift (e.g., obtain the gift from the retailer or partner and send the gift). Additionally or alternatively, the gifting service system may provide information related to the planned delivery to the retailer system and/or the partner system, and the retailer system and/or partner system may perform the delivery of the gift to the recipient. In one or more embodiments, regardless of which entity performs the delivery of the gift, information related to the recipient may be provided to the retailer system and/or to the partner system(s), thereby providing the retailer and/or partner(s) with a potential new customer (i.e., the recipient).

In one or more embodiments, after step 614, the process returns to step 606, and the send offer analysis algorithm and/or the gift options algorithm are dynamically updated with the results of providing the gift notification to the recipient. In one or more embodiments, the acceptance of the gift, and the gift option selected for delivery, are associated with the sender information, the product details, any recipient information, and the order confirmation details, and the associated information set is dynamically added to the training data for a machine learning model of the send offer analysis algorithm and/or the gift options algorithm, such that the machine learning model is dynamically updated. In one or more embodiments, by adding such results to the training data for the machine learning models of the send offer analysis algorithm and/or the gift options algorithm, the machine learning models may be continuously and dynamically updated to improve their ability to predict the likelihood that providing an offer to send a gift to a separate recipient to a consumer will result in the redemption of gift.

FIGS. 7-12 show an illustrative example of a consumer receiving an offer to send a gift received as the result of the purchase to a separate recipient, of the consumer electing to send the gift, and of the intended recipient being notified of and redeeming the gift in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Figure 7:
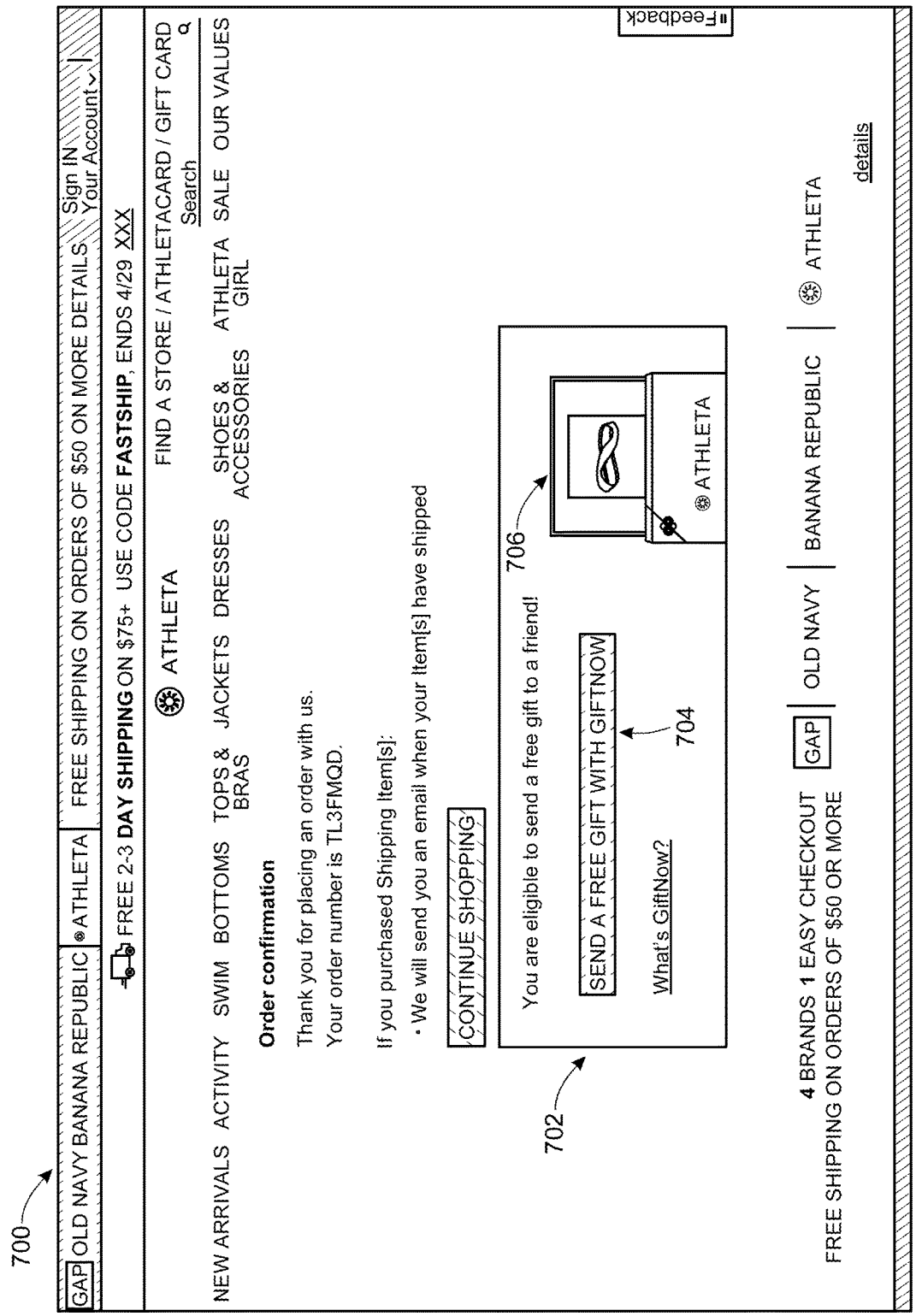
FIG. 7 shows an illustrative example of a page that includes an order confirmation and an offer to send a gift received with a purchase to a separate recipient in accordance with at least one embodiment.

Referring to FIG. 7, consider a scenario in which a consumer has visited the website of a retailer using a browser application of a sender device (e.g., sender device 102 of FIG. 1) in order to view product offerings of the retailer. The website is provided by a retailer system (e.g., retailer system 104 of FIG. 1). In this scenario, the consumer chose a product, and requested a transaction with the retailer system to purchase the product. The consumer provided information such as the consumer's contact information, shipping address, and payment information and clicked on a button on the checkout page to place an order for the product, thereby initiating the transaction to purchase the product.

The transaction request is received by a retailer system associated with the retailer. In response to receiving the request for the transaction, the retailer system generates order confirmation details, which include the name of the product, various details about the product (e.g., the brand of the product), the purchase price, the date of purchase, and an order number. The order confirmation details are then transmitted to a gifting service system (e.g., gifting service system 112 of FIG. 1).

In response to receiving the order confirmation details from the retailer system, the gifting service system invokes a send offer analysis algorithm (e.g., send offer analysis algorithm 120 of FIG. 1). The send offer analysis algorithm analyzes the order confirmation details, along with product information and sender information, in order to determine whether the purchase qualifies the consumer to be presented with an option to receive a gift received as a result of the purchase to a separate recipient. Specifically, the send offer analysis algorithm uses the order confirmation details to determine that the purchase price was greater than $100, and uses a trained machine learning model that predicts that the consumer has greater than an 80% likelihood of sending a gift to a separate recipient when presented with an offer to do so. The machine learning model prediction was based at least in part on analyzing sender information about the consumer received from the retailer, additional information about the consumer obtained from other sources, product information related to the purchased product, demographic data associated with the consumer, and historical data indicating whether similar consumers purchasing similar products in the past have selected to send a gift to a separate recipient when presented with an offer to do so.

Based on the analysis dynamically performed by the send offer analysis algorithm the gifting service system transits a send offer decision to the retailer system indicating that the consumer should be provided with an offer to send a gift received as a result of the purchase to a separate recipient. In response to receiving the send offer decision, the retailer system generates page 700 shown in FIG. 7.

As shown in FIG. 7, page 700 includes an order confirmation thanking the consumer for the purchase and providing an order number to the consumer. Based on the send offer decision provided by the gifting service system, the page 700 also includes an offer 702 for the consumer to send a gift received with the purchase to a separate recipient. The offer 702 includes text indicating to the consumer that the consumer is eligible to send a gift to a friend. The offer 702 also includes an image 706 representing a gift option that the consumer may send. The offer 702 also includes an interactive element, button 704. The button includes a text signal to the consumer that the consumer should select the button 704 in order to send the gift to a separate recipient.

When the consumer views the offer 702, the consumer selects the button to send a gift. The selection of the button 704 is received by the gifting service system, which responds by presenting page 800 shown in FIG. 8 to the consumer who, by selecting button 704, has become a sender of a gift.

Figure 8:
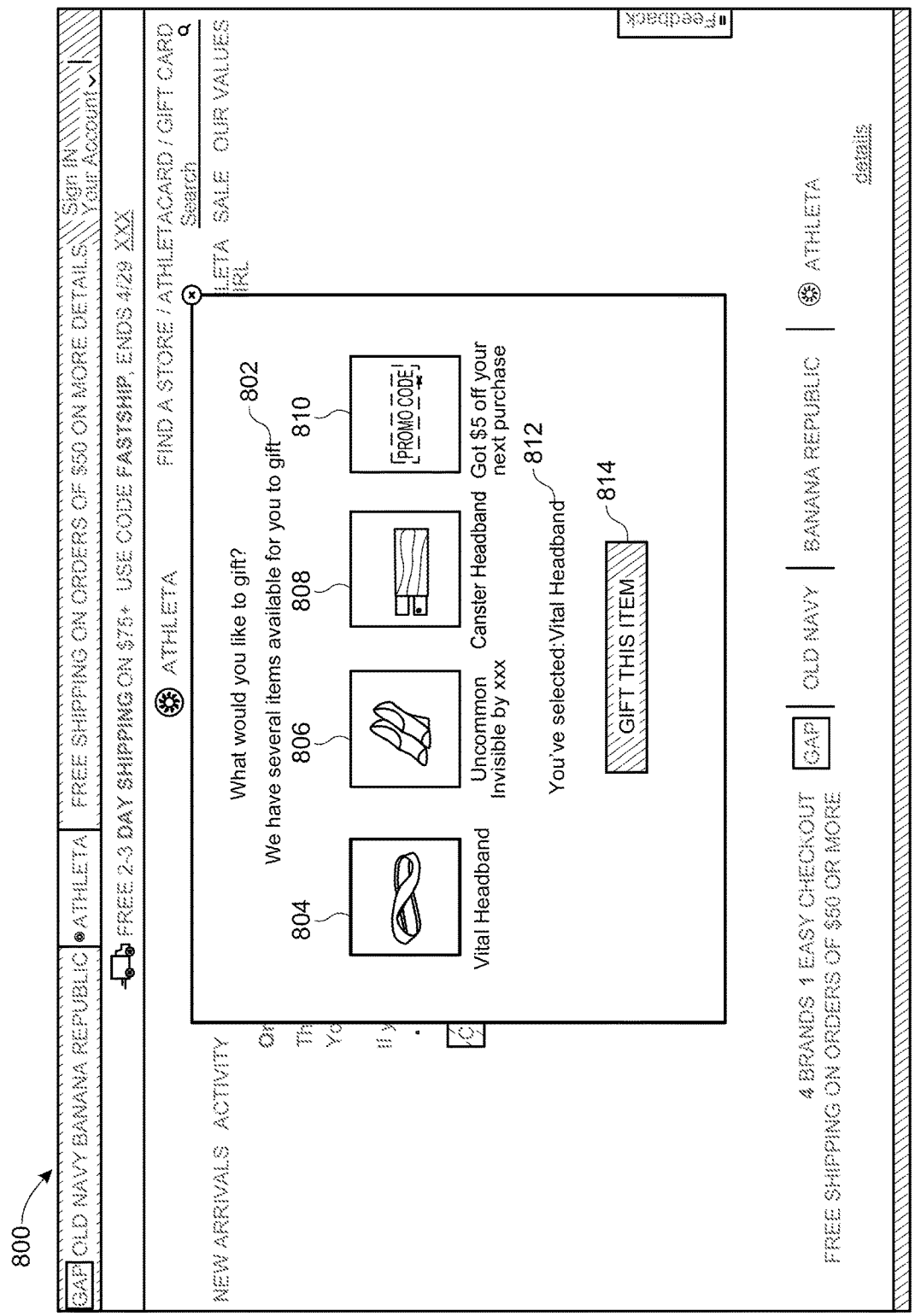
FIG. 8 shows an illustrative example of a page that includes various gift options that may be selected to send to a separate recipient in accordance with at least one embodiment.

As shown in FIG. 8, the page 800 includes four gift options (i.e., 804, 806, 808, and 810). The gift options were generated by a gift options algorithm (e.g., gift options algorithm 122 of FIG. 1). The gift options algorithm dynamically analyzes the order confirmation details, product information, and sender information to determine the four gift options (804, 806, 808, and 810). Specifically, the gift options algorithm dynamically determines, using the order confirmation details, that the purchase price is between $100 and $200. The gift options algorithm further dynamically determines, using the product information, that the retailer has remaining inventory of two gift options 804 and 808 that are to be offered as gift options to consumers that make a purchase between $100 and $200. Additionally, the gift options algorithm determines that a partner of the retailer is offering gift option 806 to any consumer that makes a purchase from the retailer of a specific brand, and uses the order confirmation details and product information to determine that the product purchased by the consumer was of that brand. Additionally, the gift options algorithm uses a trained machine learning model to determine, based at least in part on demographic information associated with the sender and historical demographic information of similar senders, that the inclusion of a promotional code to receive money off on a future purchase (i.e., gift option 810) would increase the likelihood that the sender will send one of the gift options. Therefore, gift option 804, gift option 806, gift option 808, and gift option 810 are determined by the gift options algorithm as the gift options that should be presented to the user. Accordingly, the gifting service system presents the gift options to the sender in the page 800, using images of the gift options.

The page 800 also includes a signal 802 to the sender that the sender should select from among the presented gift options. In this scenario, the sender selects gift option 804. When the sender selects gift option 804, the page is updated to include signal 812 that confirms the current gift option selection of the sender. The page 800 also includes an interactive element, button 814. The button 814 includes a signal to the sender to select the button 814 to send the gift. The button 814 is an interactive element, but cannot be selected on the page 800 until the sender has selected a gift option, which in this scenario, the sender has done.

When the sender selects button 814 of the page 800, the selection is received by the gifting service system. In response, the gifting service system presents to the sender page 900 shown in FIG. 9. Page 900 includes an image 904 of the gift selected by the sender. Page 900 also includes a request 902 for the sender to select a communication channel (email, text, messenger, or print and hand deliver) through which the recipient will be notified of the gift. In this scenario, the sender selects email as the communication channel through which the sender will receive notification of the gift.

The page 900 also includes additional requests for information 906 to be provided by the sender to facilitate sending the gift to the recipient. The additional requests for information 906 include a request for a selection of the design of virtual gift wrapping for the gift which, in this scenario, include a choice between the virtual gift wrapping that displays the name of the retailer or that says "Happy Birthday". The additional requests for information 906 also include a request that the sender provide a name of the recipient, and an email address of the recipient. The request for the email address of the recipient is presented based on the selection by the sender of email as the communication channel through which the recipient will be notified of the gift. The additional requests for information 906 also include a request for the name of the sender, as well as to optionally add a greeting to be provided to the recipient with the gift notification.

Figure 9:
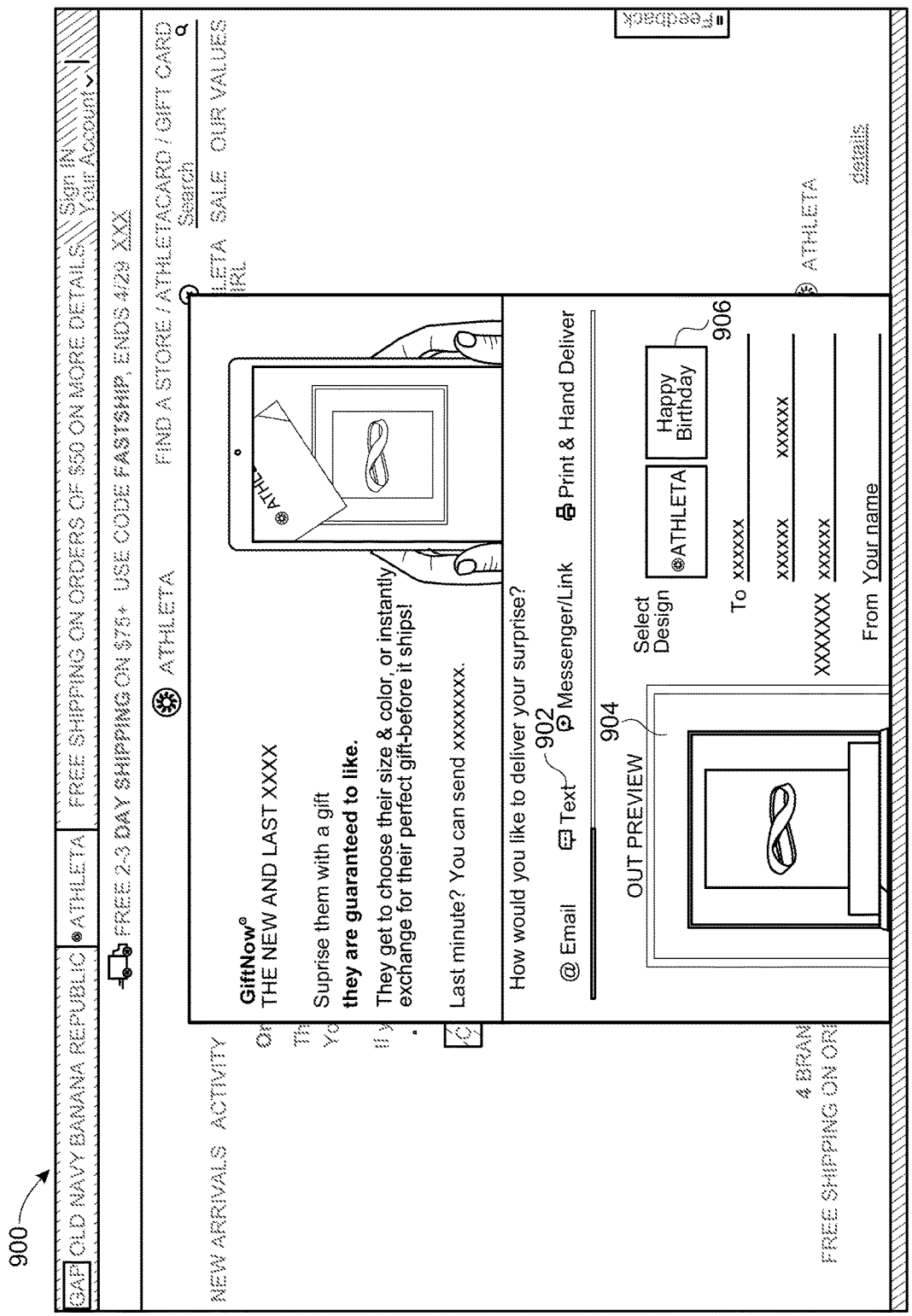
FIG. 9 shows an illustrative example of a page that includes requests for information from a sender in accordance with at least one embodiment.

Although not shown in FIG. 9, the page 900 also includes a button that the sender selects when the communication channel has been selected and the requested information provided. When the sender selects the button, the selections and information provided by the sender are transmitted to the gifting service system. In response to receiving the sender selections and information, the gifting service system generates and email, and transmits the email using the email address of the recipient provided by the sender.

Figure 10:
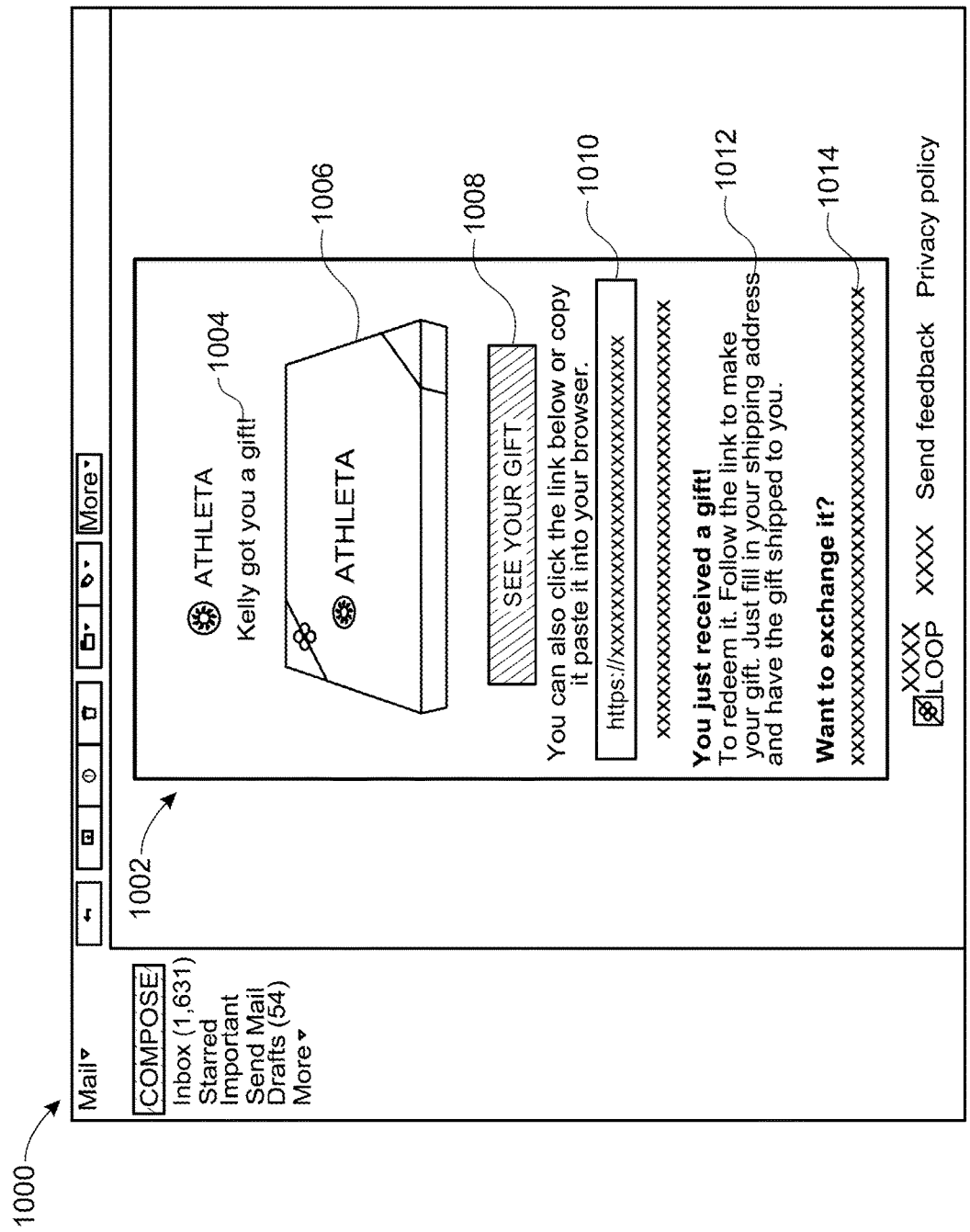
FIG. 10 shows an illustrative example of a gift notification in accordance with at least one embodiment.
Figure 11:
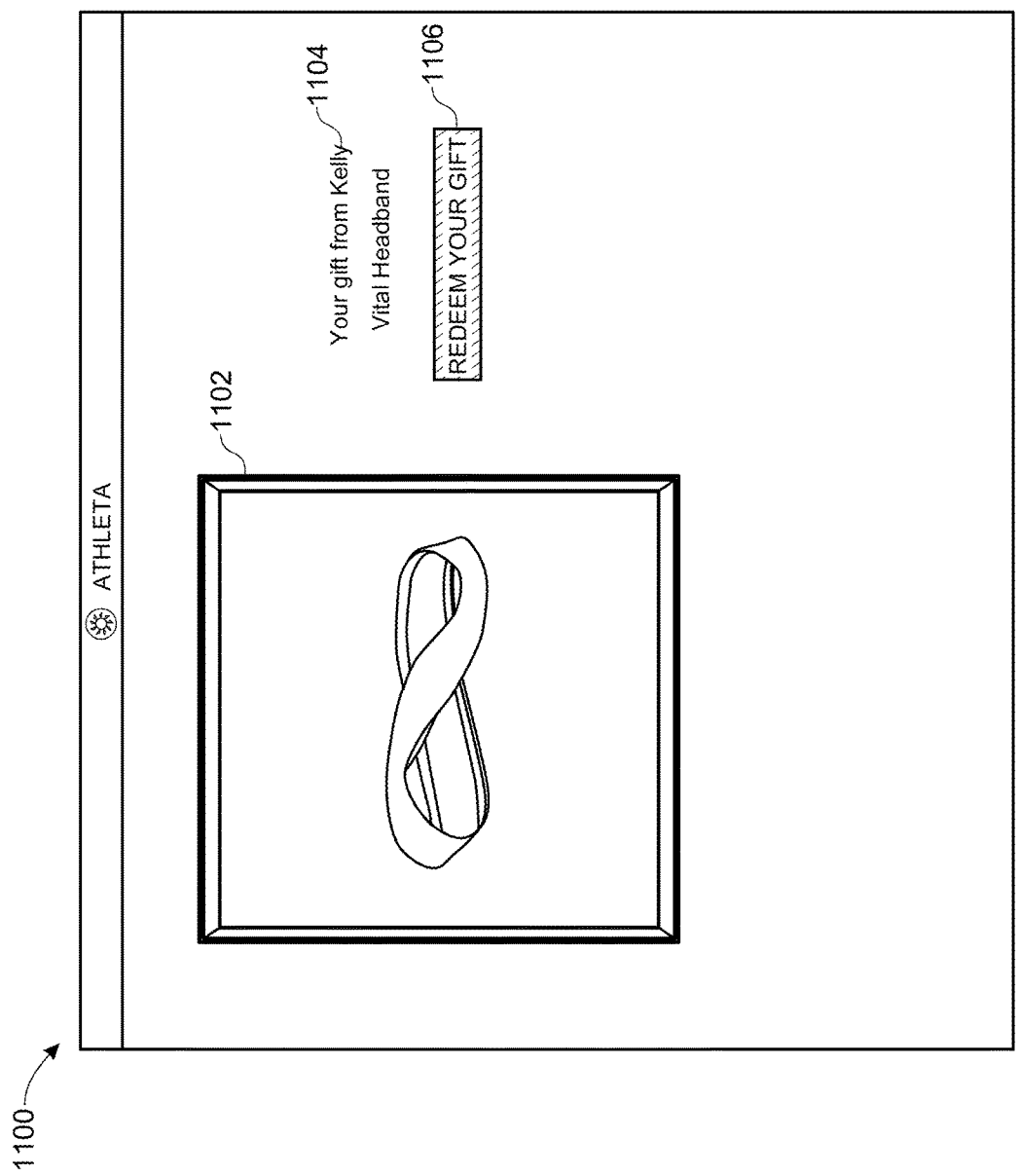
FIG. 11 shows an illustrative example of a page that presents a gift to a recipient from a sender in accordance with at least one embodiment.
Figure 12:
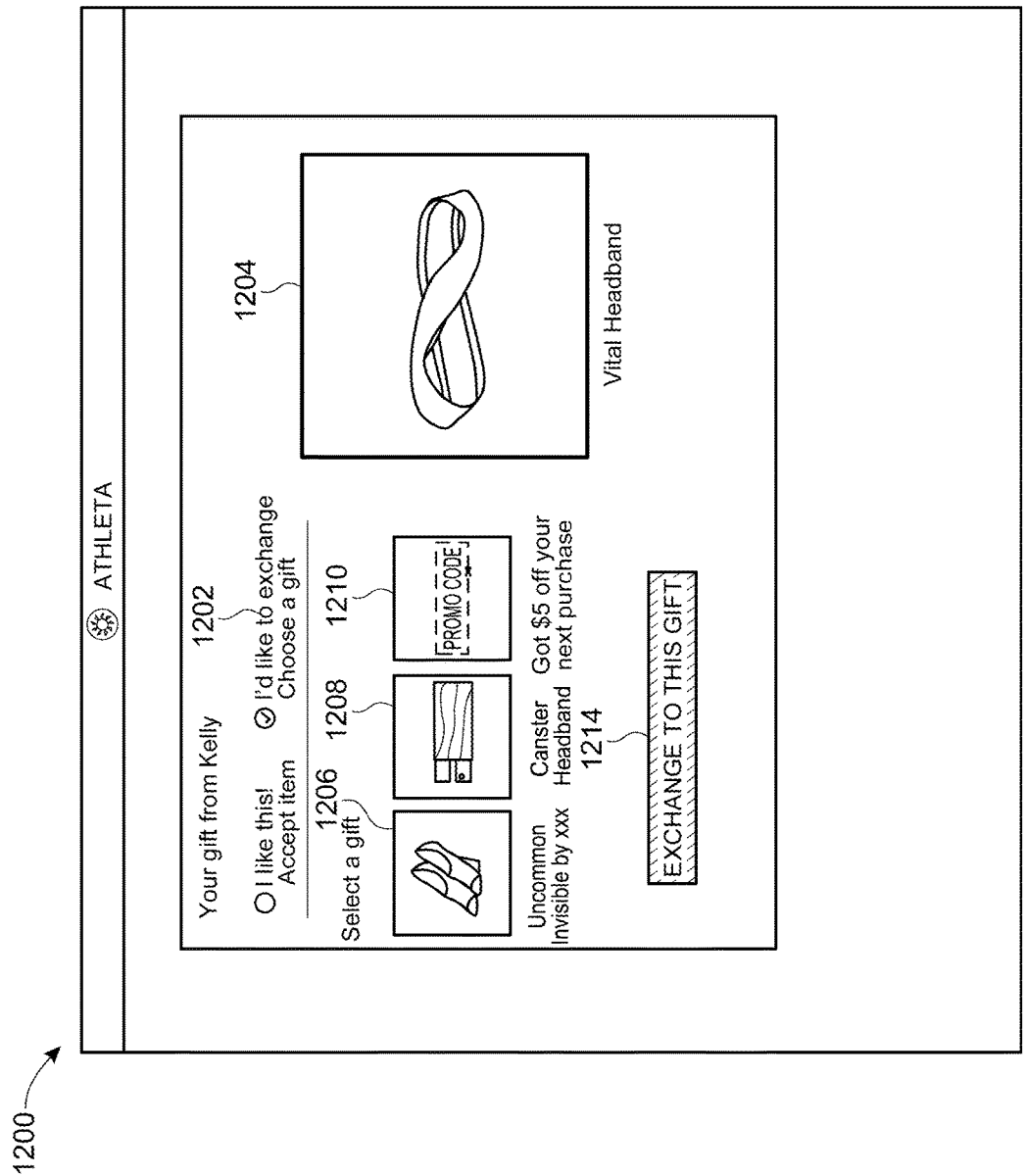
FIG. 12 shows an illustrative example of a page that requests various selections be made by a recipient in accordance with at least one embodiment.

FIG. 10 shows the email 1000 generated by the gifting service system. The email 1000 is viewed by the recipient on a recipient device (e.g., recipient device 126 of FIG. 1). The email 1000 includes a gift notification 1002. The gift notification 1002 includes a signal 1004 to the recipient that the recipient has been sent a gift. The signal 1004 also identifies the sender of the gift. The gift notification 1002 also includes an image of virtual gift wrapping 1006. The gift notification 1002 also includes an interactive element, button 1008. The button 1008 includes a text signal to the recipient that the recipient may view the gift by selecting the button 1008. The gift notification 1002 also includes an alternate method 1010 of seeing the gift. Specifically, the alternate method 1010 includes a text hyperlink that the recipient may select, or copy and paste into a browser application to see the gift. The gift notification 1002 also includes additional information 1012 that provides the recipient with details and explanation relating to the receipt of the gift. The gift notification 1002 also includes additional information 1014 that includes an indication to the recipient that the recipient will be given the opportunity to exchange the gift.

In this scenario, the recipient selects the button 1008 to see the gift. After selecting the button 1008, the gifting service system receives the selection, and the recipient is navigated to a page 1100, shown in FIG. 11, which is generated by the gifting service system. The page 1100 includes an image 1102 of the gift selected by the sender. The page 1100 also includes a text signal 1104 conveying to the recipient that the image represents the gift selected by the sender, as well as the name of the gift (i.e., "Vital Headband"). The page 1000 also includes an interactive element, button 1106. Button 1106 includes a text signal to the recipient to select the button 1106 to redeem the gift.

In this scenario, the recipient selects the button 1106 of page 1100 to provide an indication that the recipient would like to redeem the gift. The indication is transmitted to the gifting service system. In response to receiving the indication, the gifting service system generates and presents to the recipient a page 1200 shown in FIG. 12. The page 1200 includes an image 1204 of the sender-selected gift. The page 1200 also includes a request 1202 for the recipient to elect to proceed with the gift selected by the sender or to exchange the gift. The recipient in this scenario selects to exchange the gift. Page 1200 also includes alternate gift option 1206, alternate gift option 1208, and alternate gift option 1210, which are presented as images representing the alternate gift options that the recipient may select from among to exchange the gift. The alternate gift options in this scenario are the same as the other options presented to the sender. In order to exchange the gift, the recipient is prompted to select one of the images representing the alternate gift options. The page 1200 also includes an interactive element, button 1214. The button 1214 includes a text signal to the recipient to select the button 1214 to exchange the gift. The text signal of button 1214 is dictated by the selection, by the recipient, to exchange the gift.

Once the recipient selects the button 1214 of page 1200, the recipient is requested to provide a physical delivery address to which the gift will be shipped. Once the gifting service system receives the requested delivery information, the delivery information is provided to the retailer, who sends the gift to the address provided by the recipient. The gifting service system also provides information obtained about the recipient (e.g., email address) to the retailer, which the retailer may use to attempt to acquire the recipient as a new customer.

Additionally, the results of the above-described sending of a gift received with purchase to the separate recipient (e.g., that the sender selected to send the gift, which gift the sender selected to send, that the recipient selected to accept a gift, which gift the recipient chose to receive, etc.) are stored and added to the training data for the machine learning models of the send offer analysis algorithm and the gift options algorithm of the gifting service system, so that the machine learning models can be continuously and dynamically updated using the new information.

Figure 13:
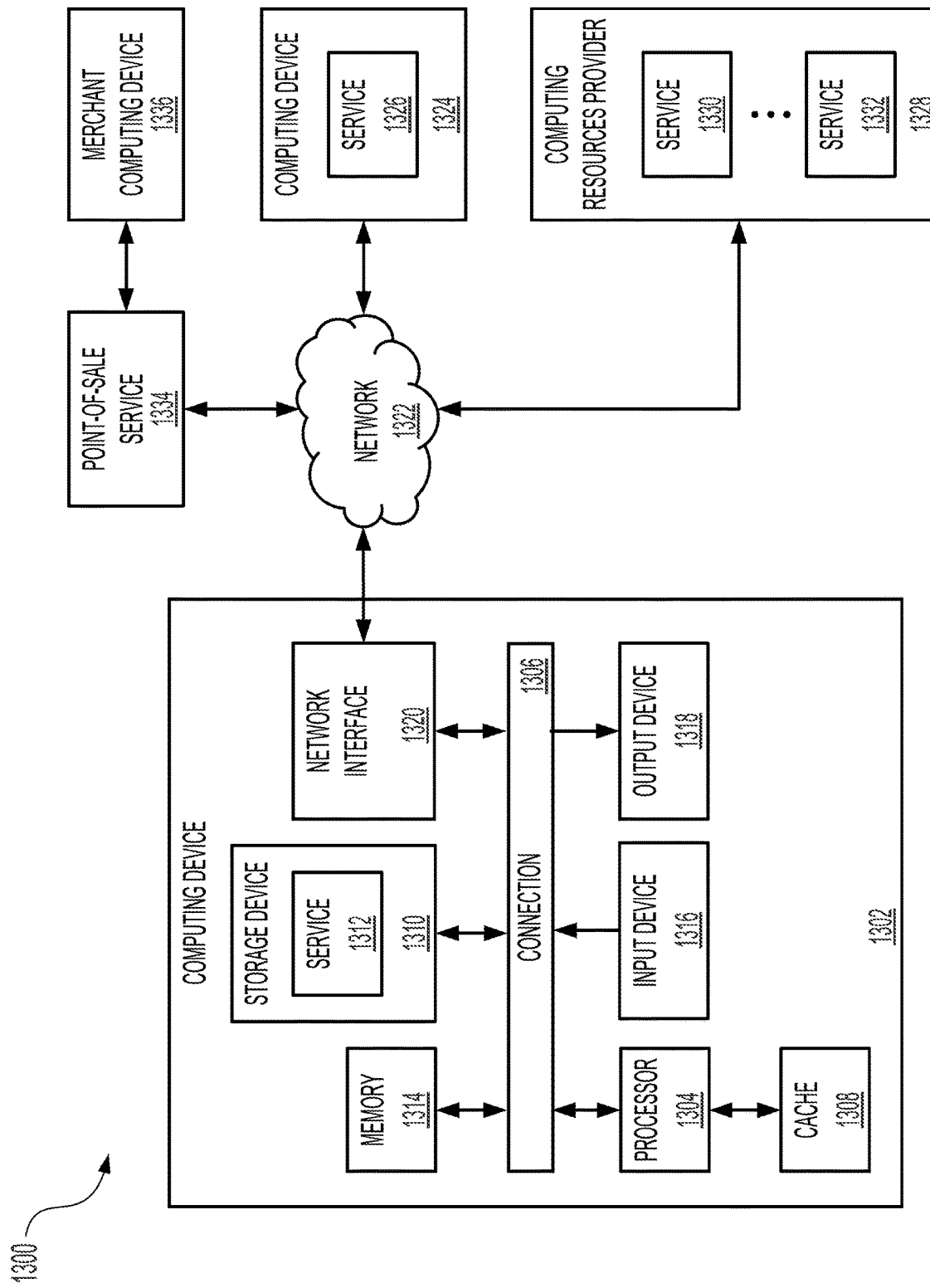
FIG. 13 shows a computing system architecture including various components in electrical communication with each other using a connection in accordance with various embodiments.

FIG. 13 illustrates a computing system architecture 1300, including various components in electrical communication with each other, in accordance with some embodiments. The example computing system architecture 1300 illustrated in FIG. 13 includes a computing device 1302, which has various components in electrical communication with each other using a connection 1306, such as a bus, in accordance with some implementations. The example computing system architecture 1300 includes a processing unit 1304 that is in electrical communication with various system components, using the connection 1306, and including the system memory 1314. In some embodiments, the system memory 1314 includes read-only memory (ROM), random-access memory (RAM), and other such memory technologies including, but not limited to, those described herein. In some embodiments, the example computing system architecture 1300 includes a cache 1308 of high-speed memory connected directly with, in close proximity to, or integrated as part of the processor 1304. The system architecture 1300 can copy data from the memory 1314 and/or the storage device 1310 to the cache 1308 for quick access by the processor 1304. In this way, the cache 1308 can provide a performance boost that decreases or eliminates processor delays in the processor 1304 due to waiting for data. Using modules, methods and services such as those described herein, the processor 1304 can be configured to perform various actions. In some embodiments, the cache 1308 may include multiple types of cache including, for example, level one (L1) and level two (L2) cache. The memory 1314 may be referred to herein as system memory or computer system memory. The memory 1314 may include, at various times, elements of an operating system, one or more applications, data associated with the operating system or the one or more applications, or other such data associated with the computing device 1302.

Other system memory 1314 can be available for use as well. The memory 1314 can include multiple different types of memory with different performance characteristics. The processor 1304 can include any general purpose processor and one or more hardware or software services, such as service 1312 stored in storage device 1310, configured to control the processor 1304 as well as a special-purpose processor where software instructions are incorporated into the actual processor design. The processor 1304 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1304 can be a microprocessor, a microcontroller, a digital signal processor ("DSP"), or a combination of these and/or other types of processors. In some embodiments, the processor 1304 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1300, an input device 1316 can represent any number of input mechanisms, such as a microphone for speech, a touch-sensitive screen for gesture or graphical input, keyboard, mouse, motion input, pen, and other such input devices. An output device 1318 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1300. In some embodiments, the input device 1316 and/or the output device 1318 can be coupled to the computing device 1302 using a remote connection device such as, for example, a communication interface such as the network interface 1320 described herein. In such embodiments, the communication interface can govern and manage the input and output received from the attached input device 1316 and/or output device 1318. As may be contemplated, there is no restriction on operating on any particular hardware arrangement and accordingly the basic features here may be substituted for other hardware, software, or firmware arrangements as they are developed.

In some embodiments, the storage device 1310 can be described as non-volatile storage or non-volatile memory.

Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 1310 can include hardware and/or software services such as service 1312 that can control or configure the processor 1304 to perform one or more functions including, but not limited to, the methods, processes, functions, systems, and services described herein in various embodiments. In some embodiments, the hardware or software services can be implemented as modules. As illustrated in example computing system architecture 1300, the storage device 1310 can be connected to other parts of the computing device 1302 using the system connection 1306. In an embodiment, a hardware service or hardware module such as service 1812, that performs a function can include a software component stored in a non-transitory computer-readable medium that, in connection with the necessary hardware components, such as the processor 1304, connection 1306, cache 1308, storage device 1310, memory 1314, input device 1316, output device 1318, and so forth, can carry out the functions such as those described herein.

The disclosed gifting service system and the associated systems and methods for providing a consumer with an option to send a gift received as the result of a purchase from a retailer to a separate recipient may be performed using a computing system such as the example computing system illustrated in FIG. 13, using one or more components of the example computing system architecture 1300. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems described herein by, for example, executing code using a processor such as processor 1304 wherein the code is stored in memory such as memory 1314 as described herein. One or more of a user device, a provider server or system, a database system, or other such devices, services, or systems may include some or all of the components of the computing system such as the example computing system illustrated in FIG. 13, using one or more components of the example computing system architecture 1300 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1328. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1304 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1314 can be coupled to the processor 1304 by, for example, a connector such as connector 1306, or a bus. As used herein, a connector or bus such as connector 1306 is a communications system that transfers data between components within the computing device 1302 and may, in some embodiments, be used to transfer data between computing devices. The connector 1306 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1314 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1314 can also include magnetic or optical data storage media including read-only (e.g., CD ROM and DVD ROM) or otherwise (e.g., CD or DVD). The memory can be local, remote, or distributed.

As described herein, the connector 1306 (or bus) can also couple the processor 1304 to the storage device 1310, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1310. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1306 can also couple the processor 1304 to a network interface device such as the network interface 1320. The interface can include one or more of a modem, network interface card (NIC), or other such network interfaces including, but not limited to those described herein. It will be appreciated that the network interface 1320 may be considered to be part of the computing device 1302 or may be separate from the computing device 1302. The network interface 1320 can include one or more of an analog modem, Integrated Services Digital Network (ISDN) modem, cable modem, token ring interface, satellite transmission interface, or other interfaces for coupling a computer system to other computer systems. In some embodiments, the network interface 1320 can include one or more input and/or output (I/O) devices. The I/O devices can include, by way of example but not limitation, input devices such as input device 1316 and/or output devices such as output device 1318. For example, the network interface 1320 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1302 can be connected to one or more additional computing devices such as computing device 1324 via a network 1322 using a connection such as the network interface 1320. In such embodiments, the computing device 1324 may execute one or more services 1326 to perform one or more functions under the control of, or on behalf of, programs and/or services operating on computing device 1302. In some embodiments, a computing device such as computing device 1324 may include one or more of the types of components as described in connection with computing device 1302 including, but not limited to, a processor such as processor 1304, a connection such as connection 1306, a cache such as cache 1308, a storage device such as storage device 1310, memory such as memory 1314, an input device such as input device 1316, and an output device such as output device 1318. In such embodiments, the computing device 1324 can carry out the functions such as those described herein in connection with computing device 1302. In some embodiments, the computing device 1302 can be connected to a plurality of computing devices such as computing device 1324, each of which may also be connected to a plurality of computing devices such as computing device 1324. Such an embodiment may be referred to herein as a distributed computing environment.

The network 1322 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1322 can be wired connections, wireless connections, or combinations thereof. Communications via the network 1322 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1322, within the computing device 1302, within the computing device 1324, or within the computing resources provider 1328 can include information, which also may be referred to herein as content. The information may include text, graphics, audio, video, haptics, and/or any other information that can be provided to a user of the computing device such as the computing device 1302. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1302 and presented to a user of the computing device 1302 using forms that are perceptible via sight, sound, smell, taste, touch, or other such mechanisms. In some embodiments, communications over the network 1322 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 1302 and/or the computing device 1324 can be connected to a computing resources provider 1328 via the network 1322 using a network interface such as those described herein (e.g. network interface 1320). In such embodiments, one or more systems (e.g., service 1330 and service 1332) hosted within the computing resources provider 1328 (also referred to herein as within "a computing resources provider environment") may execute one or more services to perform one or more functions under the control of, or on behalf of, programs and/or services operating on computing device 1302 and/or computing device 1324. Systems such as service 1330 and service 1332 may include one or more computing devices such as those described herein to execute computer code to perform the one or more functions under the control of, or on behalf of, programs and/or services operating on computing device 1302 and/or computing device 1324.

For example, the computing resources provider 1328 may provide a service, operating on service 1330 to store data for the computing device 1302 when, for example, the amount of data that the computing device 1302 attempts to store exceeds the capacity of storage device 1310. In another example, the computing resources provider 1328 may provide a service to first instantiate a virtual machine (VM) on service 1332, use that VM to access the data stored on service 1332, perform one or more operations on that data, and provide a result of those one or more operations to the computing device 1302. Such operations (e.g., data storage and VM instantiation) may be referred to herein as operating "in the cloud," "within a cloud computing environment," or "within a hosted virtual machine environment," and the computing resources provider 1328 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1328 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 1330 and service 1332 may implement versions of various services (e.g., the service 1312 or the service 1326) on behalf of, or under the control of, computing device 1302 and/or computing device 1324. Such implemented versions of various services may involve one or more virtualization techniques so that, for example, it may appear to a user of computing device 1302 that the service 1312 is executing on the computing device 1802 when the service is executing on, for example, service 1330. As may also be contemplated, the various services operating within the computing resources provider 1328 environment may be distributed among various systems within the environment as well as partially distributed onto computing device 1324 and/or computing device 1302.

In an embodiment, the computing device 1302 can be connected to one or more additional computing devices and/or services such as merchant computing device 1336 and/or a point-of-sale service 1334 via the network 1322 and using a connection such as the network interface 1320. In an embodiment, the point-of-sale service 1334 is separate from the merchant computing device 1336. In an embodiment, the point-of-sale service 1334 is executing on the merchant computing device 1336. In an embodiment, the point-of-sale service 1334 is executing as one or more services (e.g., the service 1330 and/or the service 1332) operating within the environment of the computing resources provider. As used herein, a point-of-sale service 1334 is a service used by one or more merchants to manage sales transactions for customers, to process payment transactions for customers (e.g., credit card transactions), to manage inventory for merchants, to identify customers based on, for example, customer loyalty programs, and other such tasks.

In an embodiment, a customer and/or a merchant uses the merchant computing device 1336 to interact with the point-of-sale service 1334. In an embodiment, the merchant computing device 1336 is a dedicated point-of-service (POS) terminal. In an embodiment, the merchant computing device 1336 is a cash register system. In an embodiment, the merchant computing device 1336 is an application or web service operating on a computing device such as the computing device 1302 described herein. In such an embodiment, the application or web service may be provided by a financial services system (e.g., a bank, a transaction processing system, an inventory management system, or some other such financial services system). In an embodiment, the merchant computing device 1336 includes an auxiliary device or system to execute tasks associated with the point-of-sale service 1334 (e.g., a credit card processing device attached to a smart phone or tablet). In an embodiment, the merchant computing device 1336 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor or retailer. In an embodiment, the merchant computing device 1336 is a virtual device (e.g., a virtual kiosk) such as the virtual devices described herein. Although not illustrated here, in an embodiment, the merchant computing device 1336 may be one of a plurality of devices that may be interconnected using a network such as the network 1322.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to store data temporarily or permanently.

A network interface, such as a wireless or wired interface, can enable the computing device to communicate with a network. Examples of computing devices (e.g., the computing device 1302) include, but are not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the process 400 for determining whether to provide a consumer with an offer to send a gift received as the result of a purchase to a separate recipient illustrated in FIG. 4). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1802.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to illustrate embodiments more clearly and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:

1. A computer-implemented method, comprising:
    identifying, by a gifting service system including one or more processors, order confirmation details for a completed transaction;
    performing an analysis using the order confirmation details and sender information;
    selecting one or more sender gift options that include one or more partner products associated with a retailer system, wherein the selection is performed by a send offer analysis algorithm of a machine learning system of the gifting service system, and wherein the send offer analysis algorithm uses order details to dynamically predict gift options likely to result in a gift action;
    receiving send information, wherein the send information includes a gift selection and a recipient identifier;
    transmitting a gift notification based on the recipient identifier, wherein the gift notification includes one or more recipient gift options;
    receiving one or more recipient gift selections associated with the one or more recipient gift options;
    performing, by the gifting service system, the gift action based on the one or more recipient gift selections;
    updating the send offer analysis algorithm using the send information and the gift selections gift selection as training data for updating the send offer analysis algorithm; and
    dynamically updating the send offer analysis algorithm wherein dynamically updating includes continuously training the send offer analysis algorithm over time to improve predictive accuracy using confirmation details, product data, or sender data, wherein the sender data includes data associated with purchases for which an offer to send a gift was provided to a consumer.

2. The computer-implemented method of claim 1, wherein the send information includes the one or more sender gift options and a request for a selection from among the one or more sender gift options.

3. The computer-implemented method of claim 1, wherein performing the analysis further includes analyzing inventory information, and wherein the one or more sender gift options are based on the inventory information.

4. The computer-implemented method of claim 1, wherein the completed transaction is associated with the retailer system, and the one or more sender gift options include one or more retailer products associated with the retailer system.

5. The computer-implemented method of claim 1, wherein the send information includes a request for a communication channel selection, and wherein the recipient identifier is based at least in part on the communication channel selection.

6. The computer-implemented method of claim 1, wherein the order confirmation details include product information, a price, or a date of purchase.

7. The computer-implemented method of claim 1, wherein the one or more recipient gift options include a sender-selected item and one or more alternative items.

8. The computer-implemented method of claim 1, wherein the one or more recipient gift options include customization options.

9. The computer-implemented method of claim 1, wherein the one or more recipient gift options include delivery options.

10. The computer-implemented method of claim 1, wherein the gift action includes delivering the gift.

11. The computer-implemented method of claim 1, wherein a send offer is provided as part of an order confirmation page.

12. The computer-implemented method of claim 1, wherein a send offer is provided as part of an order confirmation email.

13. The computer-implemented method of claim 1, wherein the completed transaction is associated with the retailer system, and the recipient identifier and other recipient information are provided to the retailer system.

14. A system, comprising:
    one or more processors; and
    memory storing thereon instructions that, as a result of being executed by the one or more processors, cause the system to:
    identifying, by a gifting service system, order confirmation details for a completed transaction;
    performing an analysis using the order confirmation details and sender information;
    selecting one or more sender gift options that include one or more partner products associated with a retailer system, wherein the selection is performed by a send offer analysis algorithm of a machine learning system of the gifting service system, and wherein the send offer analysis algorithm uses order details to dynamically predict gift options likely to result in a gift action;
    receiving send information, wherein the send information includes a gift selection and a recipient identifier;
    transmitting a gift notification based on the recipient identifier, wherein the gift notification includes one or more recipient gift options;
    receiving one or more recipient gift selections associated with the one or more recipient gift options;
    performing, by the gifting service system, the gift action based on the one or more recipient gift selections;
    updating the send offer analysis algorithm using the send information and the gift selection as training data for updating the send offer analysis algorithm; and
    dynamically updating the send offer analysis algorithm wherein dynamically updating includes continuously training the send offer analysis algorithm over time to improve predictive accuracy using confirmation details, product data, or sender data, wherein the sender data includes data associated with purchases for which an offer to send a gift was provided to a consumer.

15. The system of claim 14, wherein the send information includes the one or more sender gift options and a request for a selection from among the one or more sender gift options.

16. The system of claim 14, wherein performing the analysis further includes analyzing inventory information, and wherein the one or more sender gift options are based on the inventory information.

17. The system of claim 14, wherein the completed transaction is associated with the retailer system, and the one or more sender gift options include one or more retailer products associated with the retailer system.

18. The system of claim 14, wherein the send information includes a request for a communication channel selection, and wherein the recipient identifier is based at least in part on the communication channel selection.

19. The system of claim 14, wherein the order confirmation details include product information, a price, or a date of purchase.

20. The system of claim 14, wherein the one or more recipient gift options include a sender-selected item and one or more alternative items.

21. A non-transitory, computer-readable storage medium storing thereon executable instructions that, as a result of being executed by a computer system, cause the computer system to:
   identify, by a gifting service system including one or more processors, order confirmation details for a completed transaction;
   perform an analysis using the order confirmation details and sender information;
   select one or more sender gift options that include one or more partner products associated with a retailer system, wherein the selection is performed by a send offer analysis algorithm of a machine learning system of the gifting service system, and wherein the send offer analysis algorithm uses order details to dynamically predict gift options likely to result in a gift action;
   receive send information, wherein the send information includes a gift selection and a recipient identifier;
   transmit a gift notification based on the recipient identifier, wherein the gift notification includes one or more recipient gift options;
   receive one or more recipient gift selections associated with the one or more recipient gift options;
   perform, by the gifting service system, the gift action based on the one or more recipient gift selections;
   update the send offer analysis algorithm using the send information and gift selection as training data for updating the send offer analysis algorithm; and
   dynamically update the send offer analysis algorithm wherein dynamically updating includes continuously training the send offer analysis algorithm over time to improve predictive accuracy using confirmation details, product data, or sender data, wherein the sender data includes data associated with purchases for which an offer to send a gift was provided to a consumer.

22. The non-transitory, computer-readable storage medium of claim 21, wherein the send information includes the one or more sender gift options and a request for a selection from among the one or more sender gift options.

23. The non-transitory, computer-readable storage medium of claim 21, wherein performing the analysis further includes analyzing inventory information, and wherein the one or more sender gift options are based on the inventory information.

24. The non-transitory, computer-readable storage medium of claim 21, wherein the completed transaction is associated with the retailer system, and the one or more sender gift options include one or more retailer products associated with the retailer system.

25. The non-transitory, computer-readable storage medium of claim 21, wherein the send information includes a request for a communication channel selection, and wherein the recipient identifier is based at least in part on the communication channel selection.

26. The computer-implemented method of claim 1, wherein the send offer analysis algorithm of the machine learning system is trained to predict which of the one or more partner products, when presented on a sender device, are more likely to result in the sender device initiating sending a gift to a separate recipient.

27. The system of claim 14, wherein the send offer analysis algorithm of the machine learning system is trained to predict which of the one or more partner products, when presented on a sender device, are more likely to result in the sender device initiating sending a gift to a separate recipient.

28. The non-transitory, computer-readable storage medium of claim 21, wherein the send offer analysis algorithm of the machine learning system is trained to predict which of the one or more partner products, when presented on a sender device, are more likely to result in the sender device initiating sending a gift to a separate recipient.

\* \* \* \* \*